(12) United States Patent
Fujita et al.

(10) Patent No.: US 9,900,485 B2
(45) Date of Patent: Feb. 20, 2018

(54) IMAGE GENERATION DEVICE

(71) Applicant: MITSUBISHI ELECTRIC CORPORATION, Tokyo (JP)

(72) Inventors: Takeo Fujita, Tokyo (JP); Koichi Yamashita, Tokyo (JP); Narihiro Matoba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/029,746

(22) PCT Filed: Sep. 18, 2014

(86) PCT No.: PCT/JP2014/074665
§ 371 (c)(1),
(2) Date: Apr. 15, 2016

(87) PCT Pub. No.: WO2015/104870
PCT Pub. Date: Jul. 16, 2015

(65) Prior Publication Data
US 2016/0248953 A1      Aug. 25, 2016

(30) Foreign Application Priority Data

Jan. 8, 2014   (JP) .................................. 2014-001804

(51) Int. Cl.
*H04N 5/225* (2006.01)
*H04N 5/33* (2006.01)
(Continued)

(52) U.S. Cl.
CPC ............. *H04N 5/2256* (2013.01); *H04N 5/33* (2013.01); *H04N 7/183* (2013.01); *H04N 9/735* (2013.01)

(58) Field of Classification Search
CPC ........ H04N 5/2256; H04N 5/33; H04N 5/225; H04N 5/58; H04N 9/735; H04N 1/00835
See application file for complete search history.

(56) References Cited

U.S. PATENT DOCUMENTS

| 4,843,456 A | 6/1989 | Iida et al. |
| 2007/0070224 A1 | 3/2007 | Sasaki |

(Continued)

FOREIGN PATENT DOCUMENTS

| CN | 1992910 A | 7/2007 |
| CN | 102165762 A | 8/2011 |

(Continued)

OTHER PUBLICATIONS

Office Action dated Mar. 2, 2017 in counterpart Chinese Patent Application No. 201480066632.6 with an English Translation.

*Primary Examiner* — Nelson D. Hernández Hernández
(74) *Attorney, Agent, or Firm* — Birch, Stewart, Kolasch & Birch, LLP

(57) ABSTRACT

An image generation device includes: a projector for projecting pattern light of a near-infrared wavelength at intervals; an imager for outputting an imaging signal of an imaged image; a unit for generating a pattern light image by obtaining a difference between the imaging signal when the pattern light is projected and the imaging signal when the pattern light is not projected, and generating an ambient light image from the imaging signal when the pattern light is not projected; a determiner for determining a type of the ambient light; and a generator for estimating, from the type, a component due to light of a near-infrared wavelength in the ambient light image, and generating a visible light image by subtracting the component from the ambient light image. The determiner determines the type from a proportion of R, (Continued)

G, and B components in the imaged image, ambient light image, or visible light image.

14 Claims, 15 Drawing Sheets

(51) Int. Cl.
*H04N 7/18* (2006.01)
*H04N 9/73* (2006.01)

(56) References Cited

U.S. PATENT DOCUMENTS

| | | | |
|---|---|---|---|
| 2007/0146512 A1* | 6/2007 | Suzuki | H04N 5/332 348/272 |
| 2007/0285441 A1 | 12/2007 | Fukuoka | |
| 2008/0044060 A1 | 2/2008 | Satoh et al. | |
| 2008/0122933 A1 | 5/2008 | Murayama | |
| 2008/0252749 A1* | 10/2008 | Fujiwara | H04N 5/23219 348/224.1 |
| 2011/0169984 A1 | 7/2011 | Noguchi | |
| 2013/0155254 A1 | 6/2013 | Kanto et al. | |
| 2013/0155275 A1* | 6/2013 | Shimizu | H04N 5/2256 348/223.1 |
| 2013/0194390 A1 | 8/2013 | Hirooka | |

FOREIGN PATENT DOCUMENTS

| | | |
|---|---|---|
| CN | 103226014 A | 7/2013 |
| EP | 1 887 318 A2 | 2/2008 |
| JP | 63-104591 A | 5/1988 |
| JP | 6-105319 A | 4/1994 |
| JP | 9-89553 A | 4/1997 |
| JP | 11-113006 A | 4/1999 |
| JP | 2007-88873 A | 4/2007 |
| JP | 2007-89084 A | 4/2007 |
| JP | 2007-202107 A | 8/2007 |
| JP | 2007-312304 A | 11/2007 |
| JP | 2008-8700 A | 1/2008 |
| JP | 2008-67362 A | 3/2008 |
| JP | 2009-192415 A | 8/2009 |
| JP | 2010-109875 A | 5/2010 |
| JP | 2013-126165 A | 6/2013 |
| JP | 2013-128259 A | 6/2013 |

* cited by examiner

FIG. 6(a) R0(ON) 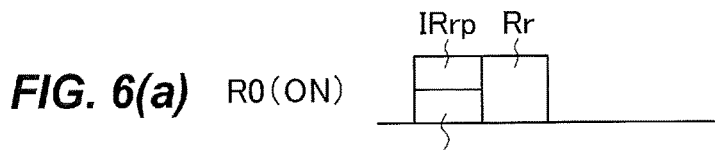
FIG. 6(b) R0(OFF) R1 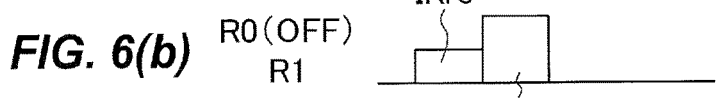
FIG. 6(c) R2 
FIG. 6(d) G0(ON) 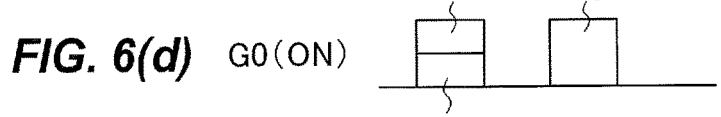
FIG. 6(e) G0(OFF) G1 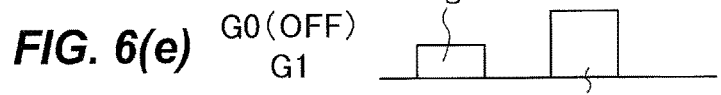
FIG. 6(f) G2 
FIG. 6(g) B0(ON) 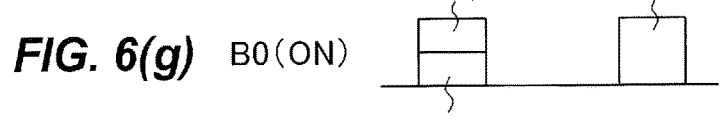
FIG. 6(h) B0(OFF) B1 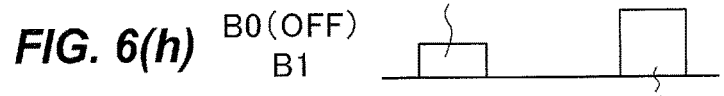
FIG. 6(i) B2 
FIG. 6(j) Y0(ON) 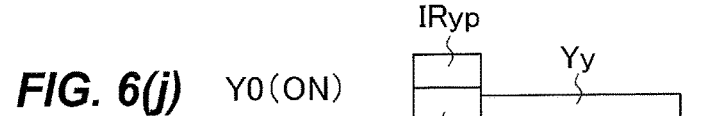
FIG. 6(k) Y0(OFF) Y1 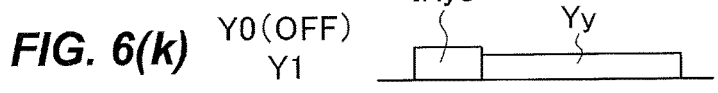
FIG. 6(l) Y2 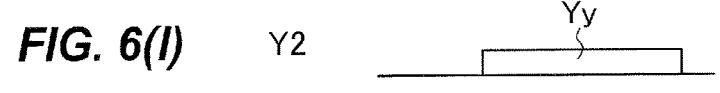

FIG. 9

| No. | c1 | c2 | c3 | c4 | c5 | c6 | c7 | c8 | No. | c1 | c2 | c3 | c4 | c5 | c6 | c7 | c8 |
|---|---|---|---|---|---|---|---|---|---|---|---|---|---|---|---|---|---|
| 0 | 0 | 1 | 1 | 0 | 0 | 0 | 0 | 0 | 28 | 0 | 1 | 1 | 0 | 0 | 1 | 1 | 0 |
| 1 | 0 | 0 | 1 | 0 | 0 | 0 | 0 | 0 | 29 | 0 | 0 | 1 | 0 | 0 | 1 | 1 | 0 |
| 2 | 1 | 0 | 1 | 0 | 0 | 0 | 0 | 0 | 30 | 1 | 0 | 1 | 0 | 0 | 1 | 1 | 0 |
| 3 | 1 | 0 | 0 | 0 | 0 | 0 | 0 | 0 | 31 | 1 | 0 | 0 | 0 | 0 | 1 | 1 | 0 |
| 4 | 1 | 0 | 0 | 0 | 0 | 0 | 0 | 1 | 32 | 1 | 0 | 0 | 0 | 0 | 0 | 1 | 0 |
| 5 | 1 | 0 | 1 | 0 | 0 | 0 | 0 | 1 | 33 | 1 | 0 | 1 | 0 | 0 | 0 | 1 | 0 |
| 6 | 0 | 0 | 1 | 0 | 0 | 0 | 0 | 1 | 34 | 0 | 0 | 1 | 0 | 0 | 0 | 1 | 0 |
| 7 | 0 | 1 | 1 | 0 | 0 | 0 | 0 | 1 | 35 | 0 | 1 | 1 | 0 | 0 | 0 | 1 | 0 |
| 8 | 0 | 1 | 0 | 0 | 0 | 0 | 0 | 1 | 36 | 0 | 1 | 0 | 0 | 0 | 0 | 1 | 0 |
| 9 | 0 | 1 | 0 | 1 | 0 | 0 | 0 | 1 | 37 | 0 | 1 | 0 | 1 | 0 | 0 | 1 | 0 |
| 10 | 0 | 0 | 0 | 1 | 0 | 0 | 0 | 1 | 38 | 0 | 0 | 0 | 1 | 0 | 0 | 1 | 0 |
| 11 | 0 | 0 | 0 | 1 | 0 | 1 | 0 | 1 | 39 | 0 | 0 | 0 | 1 | 1 | 0 | 1 | 0 |
| 12 | 0 | 1 | 0 | 1 | 0 | 1 | 0 | 1 | 40 | 0 | 1 | 0 | 1 | 1 | 0 | 1 | 0 |
| 13 | 0 | 1 | 0 | 0 | 0 | 1 | 0 | 1 | 41 | 0 | 1 | 0 | 0 | 1 | 0 | 1 | 0 |
| 14 | 0 | 1 | 1 | 0 | 0 | 1 | 0 | 1 | 42 | 0 | 1 | 1 | 0 | 1 | 0 | 1 | 0 |
| 15 | 0 | 0 | 1 | 0 | 0 | 1 | 0 | 1 | 43 | 0 | 0 | 1 | 0 | 1 | 0 | 1 | 0 |
| 16 | 1 | 0 | 1 | 0 | 0 | 1 | 0 | 1 | 44 | 1 | 0 | 1 | 0 | 1 | 0 | 1 | 0 |
| 17 | 1 | 0 | 0 | 0 | 0 | 1 | 0 | 1 | 45 | 1 | 0 | 0 | 0 | 1 | 0 | 1 | 0 |
| 18 | 1 | 0 | 0 | 0 | 0 | 1 | 0 | 0 | 46 | 1 | 0 | 0 | 0 | 1 | 0 | 0 | 0 |
| 19 | 1 | 0 | 1 | 0 | 0 | 1 | 0 | 0 | 47 | 1 | 0 | 1 | 0 | 1 | 0 | 0 | 0 |
| 20 | 0 | 0 | 1 | 0 | 0 | 1 | 0 | 0 | 48 | 0 | 0 | 1 | 0 | 1 | 0 | 0 | 0 |
| 21 | 0 | 1 | 1 | 0 | 0 | 1 | 0 | 0 | 49 | 0 | 1 | 1 | 0 | 1 | 0 | 0 | 0 |
| 22 | 0 | 1 | 0 | 0 | 0 | 1 | 0 | 0 | 50 | 0 | 1 | 0 | 0 | 1 | 0 | 0 | 0 |
| 23 | 0 | 1 | 0 | 1 | 0 | 1 | 0 | 0 | 51 | 0 | 1 | 0 | 1 | 1 | 0 | 0 | 0 |
| 24 | 0 | 0 | 0 | 1 | 0 | 1 | 0 | 0 | 52 | 0 | 0 | 0 | 1 | 1 | 0 | 0 | 0 |
| 25 | 0 | 0 | 0 | 1 | 0 | 1 | 1 | 0 | 53 | 0 | 0 | 0 | 1 | 0 | 0 | 0 | 0 |
| 26 | 0 | 1 | 0 | 1 | 0 | 1 | 1 | 0 | 54 | 0 | 1 | 0 | 1 | 0 | 0 | 0 | 0 |
| 27 | 0 | 1 | 0 | 0 | 0 | 1 | 1 | 0 | 55 | 0 | 1 | 0 | 0 | 0 | 0 | 0 | 0 |

FIG. 12(a) G1 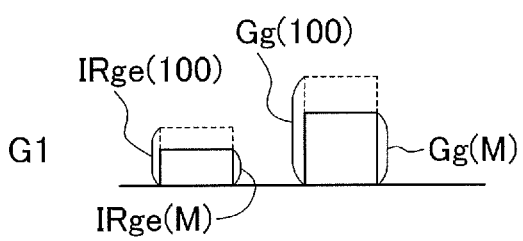
FIG. 12(b) Y1 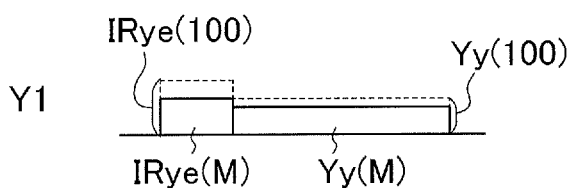
FIG. 12(c) IRyp 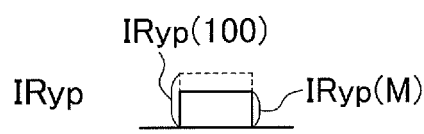

FIG. 14(a)

| GB11 | BB21 | GB31 | BB41 | GB51 | BB61 |
|------|------|------|------|------|------|
| *RR12* | GR22 | *RR32* | GR42 | *RR52* | GR62 |
| GB13 | BB23 | GB33 | BB43 | GB53 | BB63 |
| *RR14* | GR24 | *RR34* | GR44 | *RR54* | GR64 |
| GB15 | BB25 | GB35 | BB45 | GB55 | BB65 |
| *RR16* | GR26 | *RR36* | GR46 | *RR56* | GR66 |

FIG. 14(b)

| GB11 | BB21 | *GB31* | BB41 | GB51 | BB61 |
|------|------|------|------|------|------|
| RR12 | *GR22* | RR32 | *GR42* | RR52 | GR62 |
| *GB13* | BB23 | *GB33* | BB43 | *GB53* | BB63 |
| RR14 | *GR24* | RR34 | *GR44* | RR54 | GR64 |
| GB15 | BB25 | *GB35* | BB45 | GB55 | BB65 |
| RR16 | GR26 | RR36 | GR46 | RR56 | GR66 |

FIG. 14(c)

| GB11 | *BB21* | GB31 | *BB41* | GB51 | *BB61* |
|------|------|------|------|------|------|
| RR12 | GR22 | RR32 | GR42 | RR52 | GR62 |
| GB13 | *BB23* | GB33 | *BB43* | GB53 | *BB63* |
| RR14 | GR24 | RR34 | GR44 | RR54 | GR64 |
| GB15 | *BB25* | GB35 | *BB45* | GB55 | *BB65* |
| RR16 | GR26 | RR36 | GR46 | RR56 | GR66 |

IMAGE GENERATION DEVICE

TECHNICAL FIELD

The present invention relates to an image generation device capable of obtaining information about a distance to an object present in an imaging space in association with an imaged image.

BACKGROUND ART

As a conventional vehicle periphery monitoring device, there is a known device that radiates spatial pattern light from a light projector, captures an image of an observed region irradiated with the pattern light by a camera, and measures a distance to an object present in the observed region on the basis of an irradiation direction of the pattern light in the captured image, an imaging direction of the pattern light, and the relative positional relationship between the light projector and the camera (see, e.g., Patent Reference 1).

PRIOR ART REFERENCES

Patent References

Patent Reference 1: Japanese Patent Application Publication No. 2008-067362 (page 2, claim 1)

SUMMARY OF THE INVENTION

Problems to be Solved by the Invention

In the conventional monitoring device, to prevent a problem in that an object present in the observed region is difficult to perceive with the naked eye because the radiated pattern light is visible, light in an invisible wavelength band, such as near-infrared light, is typically used as the pattern light.

In this case, to capture an image of the pattern light by a camera, it is necessary to use a camera having sensitivity at a wavelength of the pattern light in addition to other wavelengths. Image capturing with a camera having sensitivity at a wavelength other than visible light has a problem in that, even when no pattern light is projected, a component other than visible light in ambient light affects the image capturing, deteriorating color reproducibility of the captured image, and preventing an object from being correctly recognized.

The present invention has been made to solve the above-described problem, and is intended to remove effect of a component other than visible light in ambient light from an image signal of a captured image and obtain an image with high color reproducibility, in generating an image with distance information.

Means for Solving the Problems

To solve the above problem, an image generation device of the present invention includes:

a light projector for projecting pattern light of a near-infrared wavelength into an imaging space at intervals of a predetermined number of frame periods;

an imager for imaging an object in the imaging space and outputting an imaging signal including an R signal, a G signal, and a B signal respectively representing an R component, a G component, and a B component of an imaged image, the object being illuminated by ambient light and subjected to projection of the pattern light at intervals of the predetermined number of frame periods;

a controller for providing the light projector with an instruction on a projection intensity of the pattern light;

an image difference acquisition unit for generating a pattern light image by obtaining a difference between the imaging signal obtained when the pattern light is projected and the imaging signal obtained when the pattern light is not projected, of the imaging signal obtained by imaging by the imager, and generating an ambient light image from the imaging signal obtained when the pattern light is not projected;

an ambient light type determiner for determining a type of the ambient light; and a visible light image generator for generating, from the type of the ambient light determined by the ambient light type determiner, component ratio information indicating a component ratio of light of a near-infrared wavelength included in the ambient light, estimating a component due to the light of the near-infrared wavelength included in the ambient light in the ambient light image on a basis of the generated component ratio information, and generating a visible light image by subtracting the component due to the light of the near-infrared wavelength from the ambient light image, wherein the ambient light type determiner determines the type of the ambient light from a proportion of R, G, and B components in the imaged image, the ambient light image, or the visible light image.

Effect of the Invention

According to the present invention, when an image with distance information is generated, it is possible to remove a component of ambient light at a wavelength other than visible light from an image signal of a captured image and obtain an image with high color reproducibility.

BRIEF DESCRIPTION OF THE DRAWINGS

FIG. 9 is a diagram illustrating an example of discrimination codes used in the projection pattern.

FIGS. 12(a) to 12(c) are diagrams illustrating components included in data appearing at different parts of the image processor 40.

FIGS. 14(a) to 14(c) are diagrams illustrating the arrangements of pixels added by an intensifying processor 47 in FIG. 1.

MODES FOR CARRYING OUT THE INVENTION

First Embodiment

Figure 1:
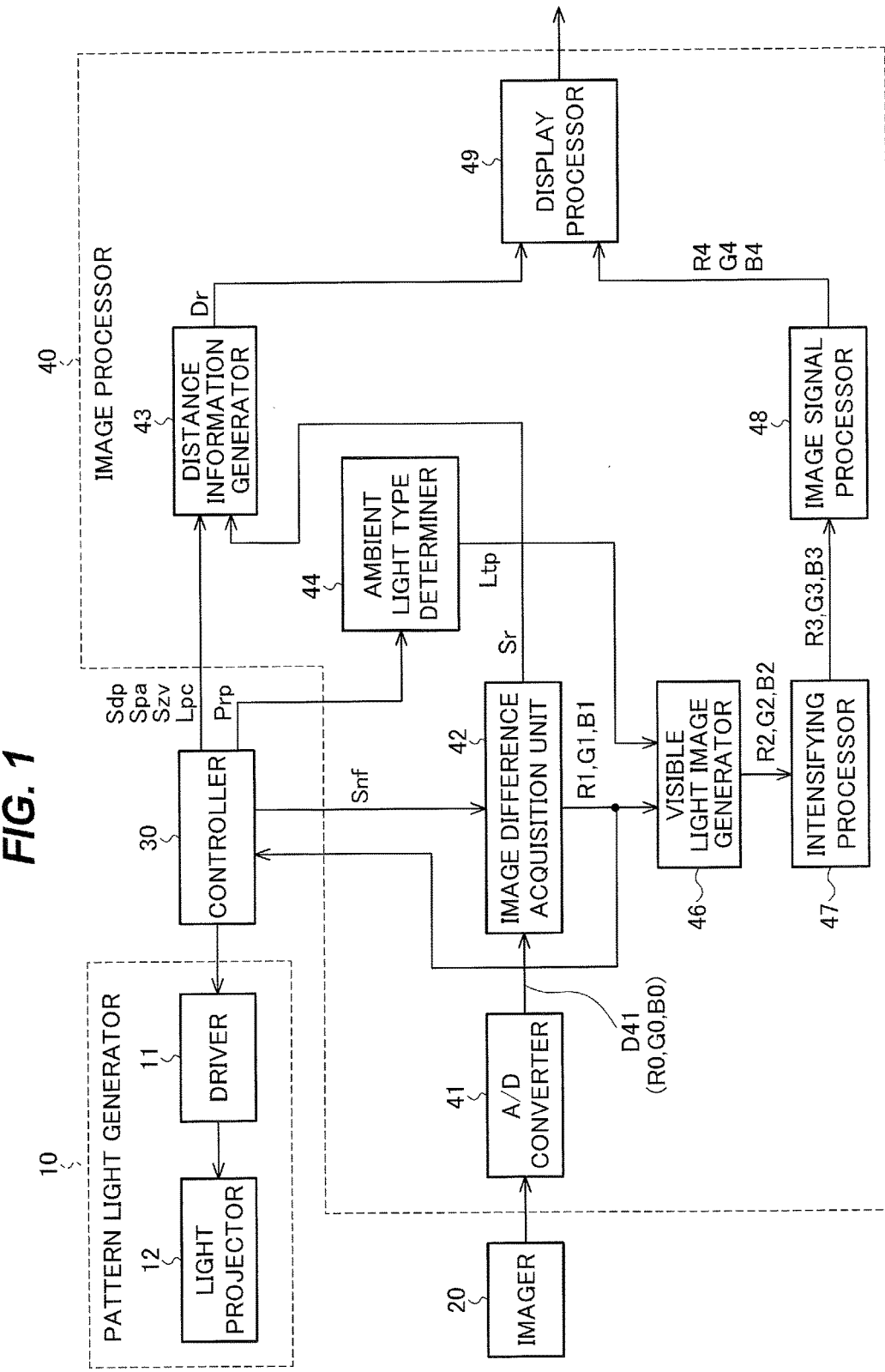
FIG. 1 is a block diagram illustrating an image generation device in a first embodiment of the present invention.

FIG. 1 illustrates a configuration of an image generation device in a first embodiment of the present invention. The illustrated image generation device includes a pattern light generator 10, an imager 20, a controller 30, and an image processor 40.

The pattern light generator 10 includes a driver 11 and a light projector 12.

Figure 2:
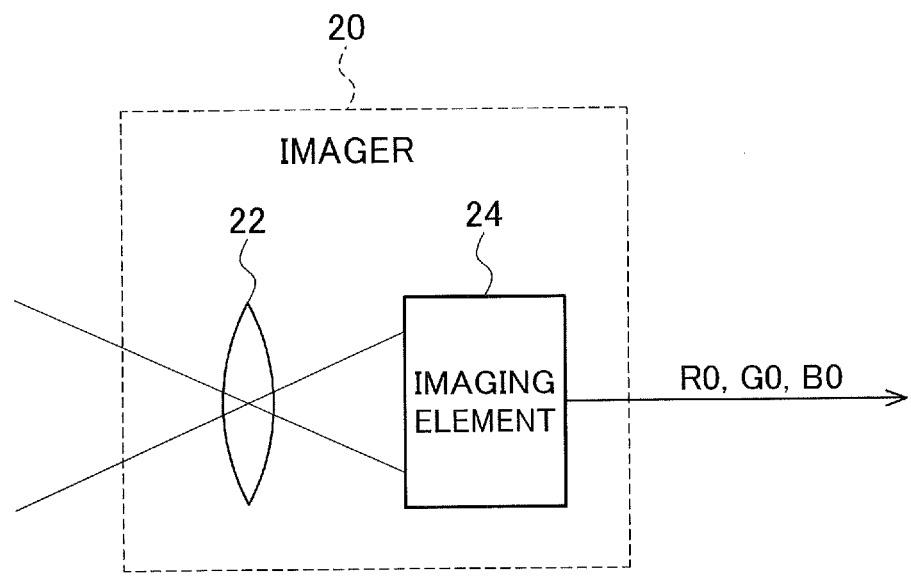
FIG. 2 is a schematic diagram illustrating an example of a configuration of an imager 20 in FIG. 1.

As illustrated in FIG. 2, the imager 20 includes a lens 22 and an imaging element 24.

Figure 3:
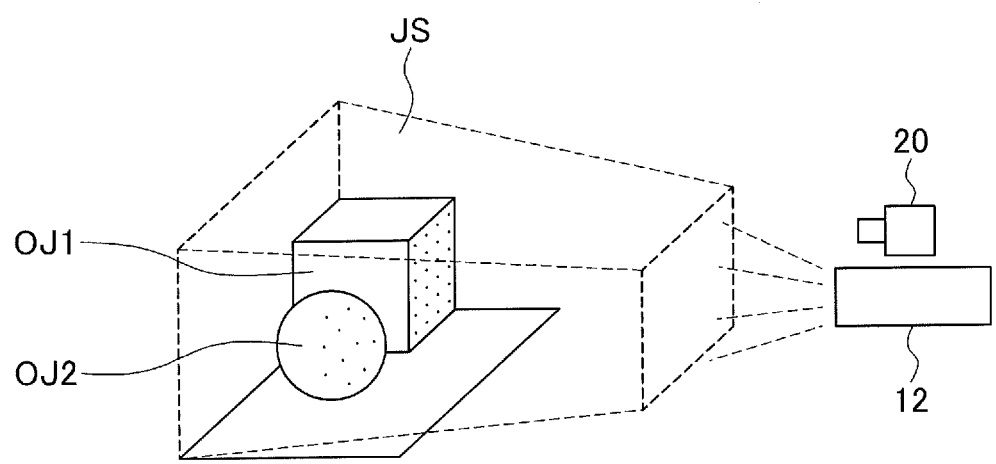
FIG. 3 is a diagram three-dimensionally illustrating the arrangement of a light projector 12 and the imager 20 in FIG. 1.

FIG. 3 three-dimensionally illustrates an imaging space (space to be imaged) JS together with the light projector 12 and imager 20. In FIG. 3, a rectangular parallelepiped object OJ1 and a spherical object OJ2 are present in the imaging space JS.

As illustrated in FIG. 3, the image generation device of the present invention projects pattern light of a near-infrared wavelength toward the objects OJ1 and OJ2 by the light projector 12, obtains, based on information obtained by imaging by the imager 20, distances to different parts of the imaged objects OJ1 and OJ2, and obtains image information and distance information for different parts of the image.

The pattern light projected by the light projector 12 generates a projection pattern. In the example illustrated in FIG. 3, the projection pattern forms light spots arrayed in a matrix form, that is, in a lateral direction (row direction) and a longitudinal direction (column direction).

Figure 4:
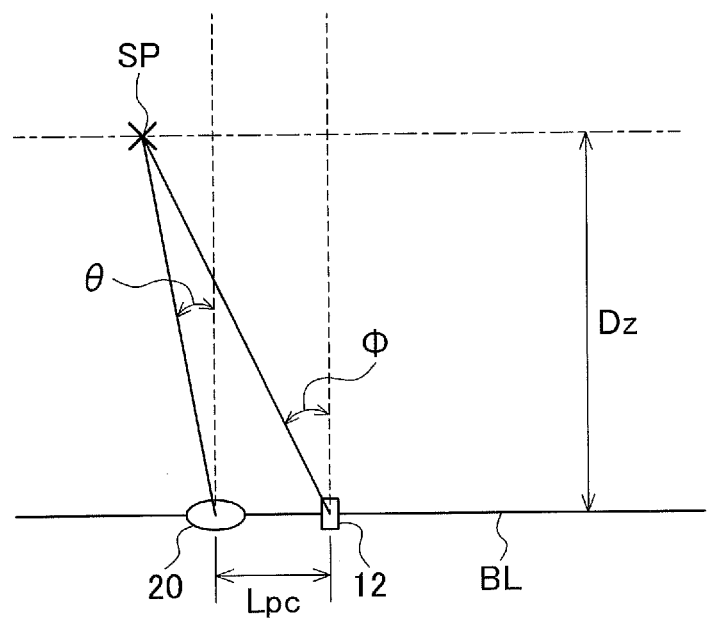
FIG. 4 is a diagram illustrating the arrangement of the light projector and imager in the first embodiment.

FIG. 4 is a top view of the light projector 12, imager 20, and a single light spot SP formed at an arbitrary point on the object OJ1 or OJ2 in the imaging space. In the illustrated example, the light projector 12 and imager 20 are spaced from each other by a distance Lpc in a horizontal direction. The straight line connecting the light projector 12 and imager 20 will be referred to as the base line BL; the distance Lpc will be referred to as the base line length.

Suppose that the light spot SP is formed on one of the objects OJ1 and OJ2 in the imaging space JS by light projected from the light projector 12 and light from the light spot SP is received by the imager 20. In this case, if the projection angle $\phi$ from the light projector 12 to the light spot SP, the incident angle $\theta$ on the imager 20 from the light spot SP, and the base line length Lpc are known, the distance Dz from the base line BL to the light spot SP on the object OJ1 or OJ2 can be obtained by calculation based on the principle of triangulation.

As illustrated in FIG. 4, the projection angle $\phi$ is the angle formed by a line perpendicular to the base line BL and a line connecting the light projector 12 and the light spot SP in the plane including the base line BL and the light spot SP.

As illustrated in FIG. 4, the incident angle $\theta$ is the angle formed by a line perpendicular to the base line BL and a line connecting the imager 20 and the light spot SP in the plane including the base line BL and the light spot SP.

The incident angle $\theta$ on the imager 20 can be obtained based on the position at which the image of the light spot SP is formed in an imaging surface of the imaging element 24, the direction of an axis line of the imaging element 24, and an angle of view.

The projection angle $\phi$ from the light projector 12 is predetermined depending on the configuration of the light projector 12, and thus is already known.

When a large number of light spots are projected from the light projector 12 at different projection angles and these light spots are imaged by the imager 20, if each of the projection angles is already known, the projection angle of each light spot can be estimated based on relationships among the positions on the image of the light spots on the imaging surface.

Figure 5:
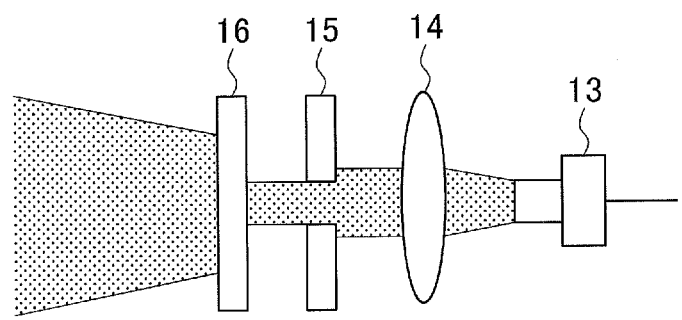
FIG. 5 is a schematic diagram illustrating an example of a configuration of the light projector 12 in FIG. 1.

As illustrated in FIG. 5, the light projector 12 includes a laser light source 13, a collimator lens 14, an aperture 15, and a diffraction grating 16.

Under control by the controller 30, the driver 11 (FIG. 1) causes the laser light source 13 to emit light; the laser light emitted from the laser light source 13 is converted to parallel light by the collimator lens 14, and given a predetermined beam diameter by the aperture 15.

The light emitted from the aperture 15 is incident on the diffraction grating 16. The diffraction grating 16 projects, into the imaging space JS, pattern light for generating a predetermined projection pattern.

The lens 22 (FIG. 2) of the imager 20 focuses an image of an object on the imaging surface of the imaging element 24.

The imaging element 24 outputs imaging signals obtained by photoelectric conversion of the incident image. The imaging element 24 has a Bayer arrangement of R, G, and B pixels, for example, and outputs R, G, and B signals as the imaging signals. Each pixel of the imaging element 24 consists of a photoelectric conversion element and a color filter disposed on the incident side of the photoelectric conversion element.

The imager 20 images the objects OJ1 and OJ2 in the imaging space JS. This imaging operation is performed at a predetermined frame frequency (frame rate), e.g., 30 fps, so that multiple consecutive frame images are obtained, and signals R0, G0, and B0 of R, G, and B color components representing the image of one frame are output during each frame period.

The objects in the imaging space are subjected to projection of the pattern light and are also illuminated by ambient light.

When pattern light is projected onto the objects OJ1 and OJ2, (a signal representing) an image in which a component (pattern light component or pattern light image) due to pattern light reflected by the objects OJ1 and OJ2 is superimposed on a component (ambient light component or ambient light image) due to ambient light reflected by the objects OJ1 and OJ2 is output from the imager 20.

When no pattern light is projected onto the objects OJ1 and OJ2, (a signal representing) an image consisting of only a component (ambient light component or ambient light image) due to ambient light reflected by the objects OJ1 and OJ2 is output from the imager 20.

The image processor 40 (FIG. 1) includes an A/D converter 41, an image difference acquisition unit 42, a distance information generator 43, an ambient light type determiner 44, a visible light image generator 46, an intensifying processor 47, an image signal processor 48, and a display processor 49.

The A/D converter 41 converts the output of the imager 20 to, for example, digital signals R0, G0, and B0 each having 8 bits (256 gray levels).

The controller 30 controls the pattern light generator 10, imager 20, and image processor 40.

Specifically, the controller 30 controls the imaging mode, frame frequency, exposure time, aperture, analog gain, or the like of the imaging element 24 of the imager 20. In the control of the exposure time, aperture, and analog gain, they are adjusted so that the brightness of the imaged image is constant.

The controller 30 also supplies the A/D converter 41 with signals for controlling operational timings.

The controller 30 also controls the projection intensity of the pattern light from the pattern light generator 10.

In the control of the projection intensity, it is adjusted so that the difference between a value of a signal when the pattern light is projected and a value of a signal when no pattern light is projected is constant.

The controller 30 also performs control to synchronize the operation of the pattern light generator 10 and the operation of the imager 20. Specifically, the controller 30 controls the imager 20 so that imaging is repeated at a predetermined frame frequency, and controls the pattern light generator 10 so that projection and non-projection of the pattern light alternate every other frame period. Specifically, the controller 30 controls the driver 11 so that the laser light source 13 is switched to the emitting state and the non-emitting state in alternate frame periods.

Further, the controller 30 supplies the image difference acquisition unit 42 with a signal Snf indicating whether the pattern light generator 10 is in the projection state or non-projection state (whether the laser light source 13 is in the emitting state or non-emitting state).

The controller 30 also generates information Prp indicating the proportion of R, G, and B components of an ambient light image. For this purpose, for example, for the entire image plane or for each of multiple areas of the image plane, it obtains the proportion of integrated values of R, G, and B signals R1, G1, and B1 output from the image difference acquisition unit 42. The controller 30 supplies the image signal processor 48 with the information Prp indicating the proportion of the R, G, and B components. The image signal processor 48 uses the information Prp indicating the proportion for white balance adjustment.

In this embodiment, the information Prp indicating the proportion is also supplied to the ambient light type determiner 44, and the ambient light type determiner 44 uses this information to determine the type of ambient light.

Further, the controller 30 holds information Sdp indicating relationships between positions in the projection pattern of the respective light spots included in the pattern light to be projected by the light projector 12, information Spa indicating correspondences between positions on the projection pattern and the projection angles of the respective light spots included in the pattern light to be projected by the light projector 12, and information Szv indicating the axial direction and angle of view of the imager 20, and information indicating the base line length Lpc, and supplies these information items to the distance information generator 43.

The light projector 12 intermittently projects pattern light every other frame period, so the imager 20 obtains images (images with projection) when the pattern light is projected and images (images without projection) when no pattern light is projected, that is, images (ambient light images) due to only ambient light, alternately every other frame period.

As illustrated in FIGS. 6(a), 6(b), 6(d), 6(e), 6(g), and 6(h), the color component signals R0, G0, and B0 output from the A/D converter 41 include, in addition to components Rr, Gg, and Bb of their respective primary colors, components (near-infrared components) IRr, IRg, and IRb due to near-infrared light because the color filter of each pixel is transmissive in the near-infrared region. Here, the "components of their respective primary colors" Rr, Gg, and Bb are components output from the imager 20 if the color filters are not transmissive to near-infrared light (near-infrared wavelength light) and/or if the photoelectric conversion elements have no sensitivity to near-infrared light.

As illustrated in FIGS. 6(a), 6(d), and 6(g), the near-infrared components IRr, IRg, and IRb in the signals R0, G0, and B0 obtained in a frame in which the light projector 12 is in the projection state (on) include components IRrp, IRgp, and IRbp due to the pattern light, and components IRre, IRge, and IRbe due to ambient light; as illustrated in FIGS. 6(b), 6(e), and 6(h), the near-infrared components IRr, IRg, and IRb in the signals R0, G0, and B0 obtained in a frame in which the light projector 12 is in the non-projection state (off) include no components IRrp, IRgp, and IRbp due to the pattern light and include only components IRre, IRge, and IRbe due to ambient light.

Figure 6M:
FIGS. 6(a) to 6(p) are diagrams illustrating components included in data appearing at different parts of an image processor 40.
Figure 6N:
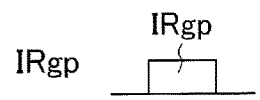
Figure 6O:
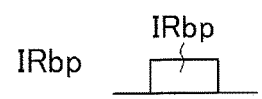

If image change (motion) between successive frames is ignored, signals indicating the pattern light components IRrp, IRgp, and IRbp illustrated in FIGS. 6(m), 6(n), and 6(o) or an image (pattern light image) represented by the signals can be obtained by determining the differences of the signals R0, G0, and B0 between successive frames (subtracting signals having no components due to the pattern light from signals having components due to the pattern light).

Further, by selecting and outputting only the signals of the frames having no components due to the pattern light, it is possible to generate signals indicating ambient light components R1, G1, and B1 illustrated in FIGS. 6(b), 6(e), and 6(h), or an image (ambient light image or image without projection) represented by the signals.

The image difference acquisition unit 42 functions to generate an image (pattern light image) (FIGS. 6(m), 6(n), and 6(o)) consisting of only the components due to the pattern light and a frame image (ambient light image) R1, G1, and B1 (FIGS. 6(b), 6(e), and 6(h)) having no components due to the pattern light, as described above.

As illustrated in FIGS. 6(b), 6(e), and 6(h), the signals R1, G1, and B1 also include near-infrared components IRre, IRge, and IRbe due to ambient light. The visible light image generator 46 functions to remove the near-infrared components IRre, IRge, and IRbe from the signals R1, G1, and B1 to generate signals R2, G2, and B2 consisting of only the components Rr, Gg, and Bb of their respective primary colors, as illustrated in FIGS. 6(c), 6(f), and 6(i).

FIG. 6(j) illustrates a luminance signal Y0 obtained by combining the signals R0, G0, and B0 of FIGS. 6(a), 6(d), and 6(g). The luminance signal Y0 includes a primary luminance component Yy and a near-infrared component IRy. The near-infrared component IRy includes a component IRyp due to the pattern light and a component IRye due to ambient light.

FIG. 6(k) illustrates a luminance signal Y1 obtained by combining the signals R1, G1, and B1 of FIGS. 6(b), 6(e), and 6(h). The luminance signal Y1 includes a primary luminance component Yy and a near-infrared component IRye due to ambient light.

FIG. 6(l) illustrates a luminance signal Y2 obtained by combining the signals R2, G2, and B2 of FIGS. 6(c), 6(f), and 6(i). The luminance signal Y2 includes only a primary luminance component Yy.

Figure 6P:
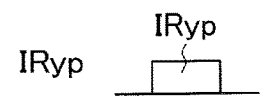

FIG. 6(p) illustrates a signal IRyp obtained by combining the signals IRrp, IRgp, and IRbp of FIGS. 6(m), 6(n), and 6(o). The signal IRyp indicates the intensity Sr of the imaged pattern light.

The process of each unit will be described below in detail.

The image difference acquisition unit 42 receives signals R0, G0, and B0 output from the A/D converter 41, and generates, based on an image when pattern light is projected and an image when no pattern light is projected, an image (pattern light image) due to the pattern light and an image (ambient light image) excluding the pattern light component. For example, it outputs, as the ambient light image, an image obtained in a frame period in which no pattern light is projected, and outputs, as the pattern light image, an image obtained by subtracting an image obtained by imaging (exposure) in a frame period in which no pattern light is projected from an image obtained by imaging (exposure) in a frame period in which pattern light is projected, these frame periods being two successive frame periods. Specifically, it subtracts the signals of the R, G, and B components obtained in the frame period in which no pattern light is projected from the signals of the R, G, and B components obtained in the frame period in which the pattern light is projected and combines these to generate a single signal indicating a pattern light component.

Figure 7:
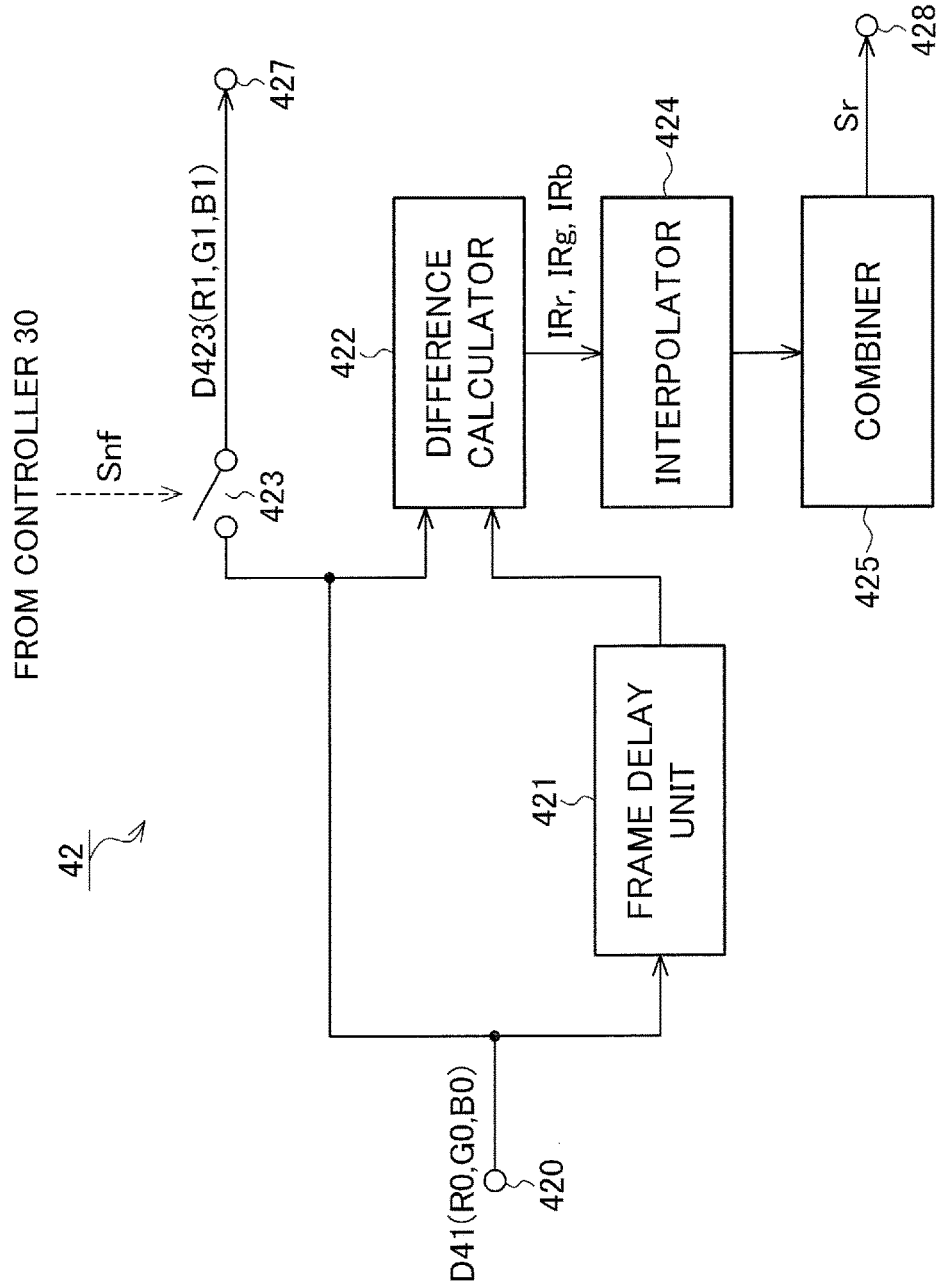
FIG. 7 is a block diagram illustrating an example of a configuration of an image difference acquisition unit 42 in FIG. 1.

FIG. 7 illustrates an exemplary configuration of the image difference acquisition unit 42.

A frame delay unit 421 delays an imaging signal D41 (R0, G0, or B0) supplied from the A/D converter 41 via an input terminal 420 by one frame period and outputs a frame delayed imaging signal D421.

A difference calculator 422 determines the difference between the imaging signal D41 and the frame delayed imaging signal D421 (difference obtained by subtracting the imaging of the frame in which no pattern light is projected from the imaging signal of the frame in which the pattern light is projected) and generates a difference signal D422.

A switch 423 is closed when the imaging signal D41 of a frame in which the light projector 12 does not project pattern light is supplied to the input terminal 420 and outputs the signal as an ambient light component D423 (R1, G1, or B1) to the visible light image generator 46 via an output terminal 427.

The above processing carried out by the frame delay unit 421, difference calculator 422, and switch 423 is performed individually for each of the R, G, and B color components. Specifically, when the R signal R0 is input to the input terminal 420, the R signal R0 is separated into the pattern light component IRrp and ambient light component (Rr+IRre); when the G signal G0 is input to the input terminal 420, the G signal G0 is separated into the pattern light component IRgp and ambient light component (Gg+IRge); when the B signal B0 is input to the input terminal 420, the B signal B0 is separated into the pattern light component IRbp and ambient light component (Bb+IRbe).

The R, G, and B signals R0, G0, and B0 input to the image difference acquisition unit 42 are signals obtained by the pixels in the Bayer arrangement, so they have only one of the R, G, and B components for each pixel, instead of having all of the color components for each pixel. The same applies to the ambient light components output from the switch 423. Likewise, the pattern light components output from the difference calculator 422 each have only a component (component included in one of the color signals R0, G0, and B0) obtained by a pixel corresponding to one of R, G, and B.

An interpolator 424 receives the R, G, and B pattern light components IRrp, IRgp, and IRbp output from the difference calculator 422 and interpolates the components missing at each pixel (near-infrared components estimated to be included in the color signals different from the color signal of each pixel) IRrp, IRgp, and IRbp.

A combiner 425 combines the three components IRrp, IRgp, and IRbp output from the interpolator 424 for each pixel.

This combination is performed, for example, according to the following calculation, as in the case of generating a luminance signal from R, G, and B signals:

$$IRyp = a1 \times IRrp + a2 \times IRgp + a3 \times IRbp. \tag{1}$$

In equation (1), a1, a2 and a3 are coefficients predetermined so that a1+a2+a3=1 is satisfied. The coefficients a1, a2, and a3 are determined according to the spectral transmission characteristics of the R, G, and B color filters of the imager 20 with respect to a near-infrared component, and the spectral sensitivity characteristics of the R, G, and B photoelectric conversion elements with respect to a near-infrared component. For simplicity, the coefficients a1, a2, and a3 may be determined so that a1=a2=a3=⅓ is satisfied.

The result (near-infrared component for each pixel) IRyp of the combination by the combiner 425 is supplied to the distance information generator 43 via an output terminal 428 as a pattern light component Sr.

On the basis of the pattern light component output from the image difference acquisition unit 42 and information regarding the projection pattern supplied from the controller 30, the distance information generator 43 generates information indicating the distances from the imager 20 to different parts of the object corresponding to different parts of the pattern light image. To generate the distance information in the distance information generator 43, a pattern including discrimination codes in addition to the light spots is used as the projection pattern. Thus, the projection pattern will be described first.

The projection pattern (projection image) projected by the light projector 12 includes the light spots arranged in a matrix as illustrated in FIG. 3 as described above, and in addition thereto includes, near each of the light spots, a dot group serving as a discrimination code.

Figure 8:
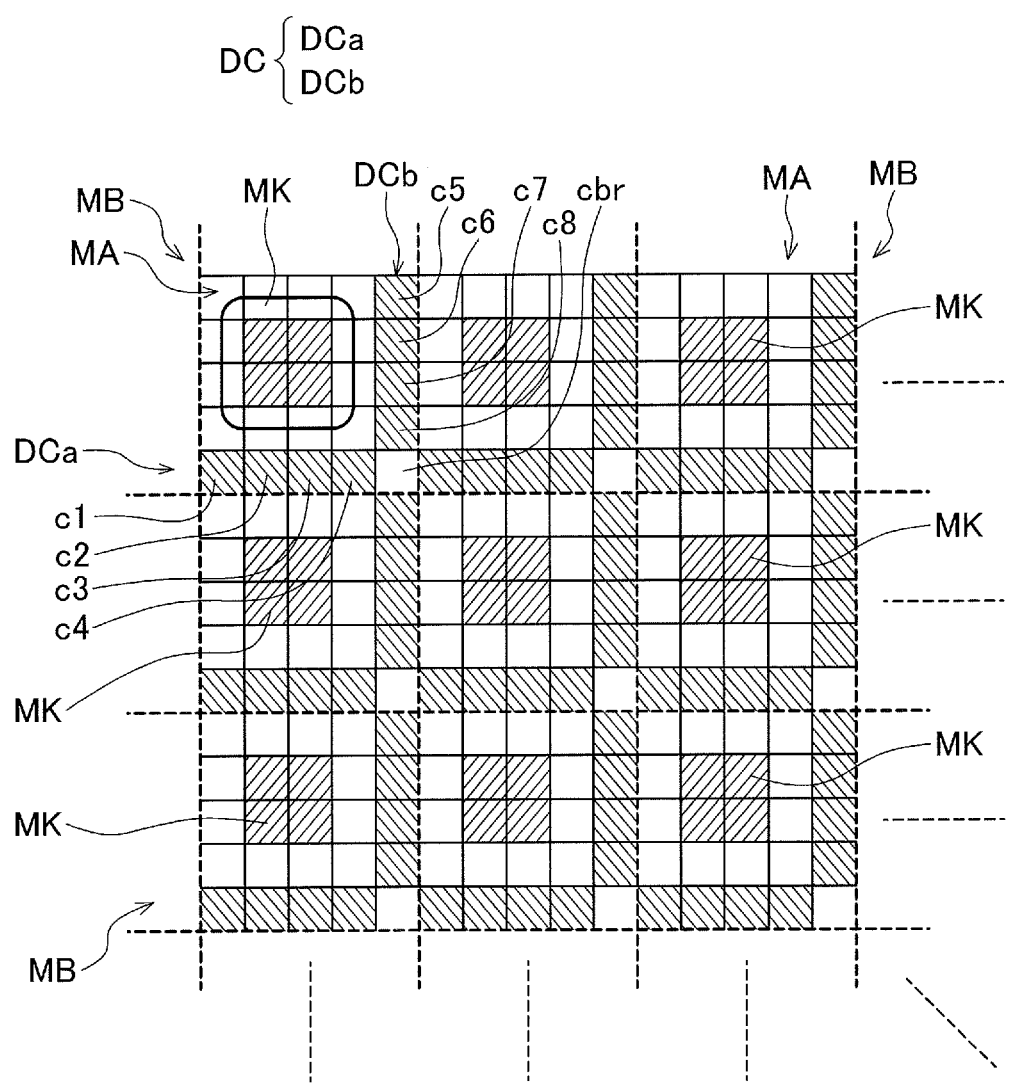
FIG. 8 is an enlarged view illustrating a part of a projection pattern.

FIG. 8 illustrates a part of the projection pattern in an enlarged manner. To simplify the explanation, the following description assumes that the projection pattern is projected onto a plane perpendicular to the optical axis of the light projector 12.

Each of the smallest squares is referred to as a dot position or a cell, and is the smallest unit in the projection pattern that can be controlled so that it is either on (the illuminated state) or off (the non-illuminated state). For example, cells arranged in 480 rows vertically and 650 columns horizontally are formed in the projection range. A cell in the illuminated state forms a dot.

Each light spot MK is formed so as to occupy an area consisting of cells in the on state arranged in two rows vertically and two columns horizontally.

For each of the two-row, two-column areas, the area around the two-row, two-column area and in the row on the upper side, the row on the lower side, the column on the left side, and the column on the right side of the two-row, two-column area consists of cells in the off state (cells that are not illuminated); the four-row, four-column area including this area and the two-row, two-column area is referred to as a spot area MA.

For each of the four-row, four-column spot areas MA, the row of cells adjacent to the lower side of the four-row, four-column spot area MA (the group of four mutually aligned dot positions adjacent to the lower side of the spot area MA) is an area forming a first portion DCa of the discrimination code; the column of cells adjacent to the right side of the spot area MA (the group of four mutually aligned dot positions adjacent to the right side of the spot area MA) is an area forming a second portion DCb of the discrimination code. The four cells in the first portion DCa are respectively indicated by reference characters c1-c4, and the four cells in the second portion DCb are respectively indicated by reference characters c5-c8.

Each of the cells in the first portion DCa and the second portion DCb can assume either the on state (illuminated state) or the off state (non-illuminated state); the combination of on and off states of these cells constitutes an eight-bit discrimination code DC. The discrimination code DC associated with each light spot MK is used to identify the light spot MK.

The cell cbr adjacent to the right end of the first portion DCa, i.e., adjacent to the lower end of the second portion DCb, is in the off state.

The entire projection pattern is formed by repetition of the area MB consisting of five rows and five columns of cells, including the discrimination code DC and cell cbr in addition to the four-row, four-column spot area MA.

The light spots MK are used to determine the positions of different parts of the projection pattern and each consist of dots arranged in two rows and two columns, so they occupy a relatively large area in the imager 20 and thus appear as relatively high brightness parts.

The discrimination code DC accompanying each light spot MK is used to determine which one of the many light spots included in the projection pattern the light spot MK is.

FIG. 9 illustrates an example of the discrimination codes used in the projection pattern. In the illustrated example, 56 different "values" from No. 0 to No. 55, that is, discrimination codes having different on/off combinations, are used. The value (on or off) of each of the cells from c1 to c8 of the discrimination code of each number (No.) is represented by "1" or "0".

Figure 10:
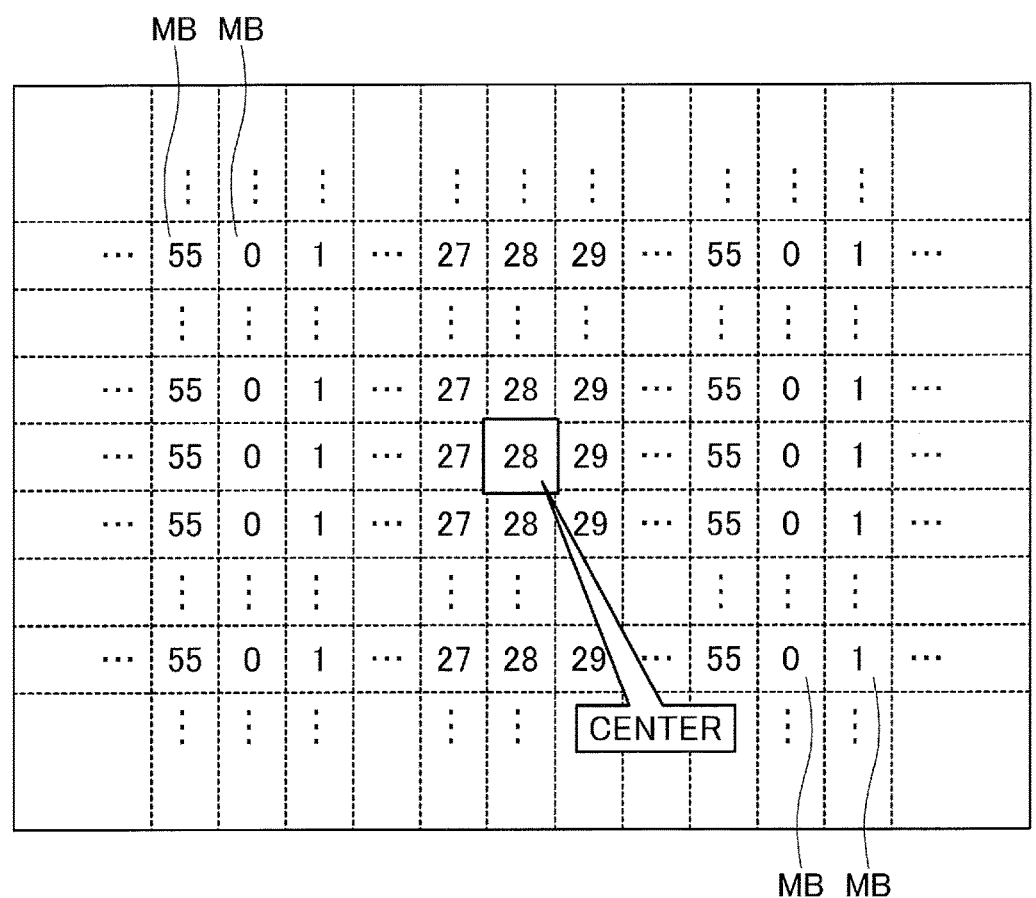
FIG. 10 is a diagram illustrating an example of the arrangement of the discrimination codes in the projection pattern.

FIG. 10 illustrates an exemplary array of the discrimination codes in the projection pattern (an exemplary array of areas each consisting of a five-row, five-column array of cells including the discrimination code). Each square in FIG. 10 corresponds to an area MB consisting of a five-row, five-column array of cells. The number in each square indicates the number (No.) of the discrimination code in FIG. 9.

In the example illustrated in FIG. 10, identical discrimination codes are lined up in the vertical direction and consecutive discrimination codes from No. 0 to No. 55 are lined up from left to right in the horizontal direction; next to (on the right side of) No. 55, No. 0 is placed again, and a similar arrangement repeats thereafter (a cyclical arrangement).

If the discrimination codes in FIGS. 8 and 9 are arranged as in FIG. 10, the array of the cells in the on state and off state (the array of the cells in the on state and the array of the cells in the off state) is point symmetric with respect to a center of the projection pattern (the center of the light spot MK in the area MB that includes the discrimination code of No. 28 and is located at the center of the projection pattern in the vertical direction).

Further, between the discrimination codes accompanying light spots that are mutually adjacent in the horizontal direction, there is always only one change in the on/off-state (change from the on state to the off state or change from the off state to the on state).

Although the number of combinations of on and off of eight cells c1-c8 is 256, instead of using all of them, only 56 of the 256 combinations are used as the discrimination codes so as to satisfy the above conditions.

The shape of the projection pattern formed when the pattern light is projected onto a plane that is not perpendicular to the optical axis of the light projector 12 is a quadrilateral other than a rectangle; the rows and columns of light spots are not mutually parallel, and the distances between the light spots are not uniform. In the projection pattern formed when the pattern light is projected onto a curved surface, the rows and columns of light spots are non-linear. If the surface onto which the pattern light is projected has bumps, steps, or the like, the magnitude relationships between the projection angles of the respective light spots (e.g., the ascending order) may not match the magnitude relationships between the incident angles of the respective light spots (e.g., the ascending order); "permutation" may occur.

In order to know the projection angle at which each light spot is projected from the light projector 12, it is necessary to identify the column in which the light spot is located in the matrix. Although the eight-bit discrimination code itself does not include enough information to identify the column, even when the order of the light spots is permuted, if the shift from the original position (order) of each light spot is within the range of the cycle of change in the "value" of the discrimination code (in the example illustrated in FIG. 10, 56 areas MB each consisting of cells arranged in five rows and five columns), it is possible to identify the non-permuted position (original position), and by identifying the original position, it is possible to identify the column in which the light spot with the discrimination code is located, for example.

The above "permutation" occurs because the light projector 12 and imager 20 are disposed at different positions in the horizontal direction; since the light projector 12 and imager 20 are disposed at the same position in the up-down direction, permutation as above does not occur in the up-down direction, so the position (order) in the up-down direction in the projection pattern can be determined by detecting the order in the imaged image. Therefore, no codes for identifying the order in the up-down direction is required.

In view of the possibility that the light projector 12 and imager 20 may also be disposed at different positions in the up-down direction, the discrimination codes may be defined so that the order in the up-down direction can also be identified.

Figure 11:
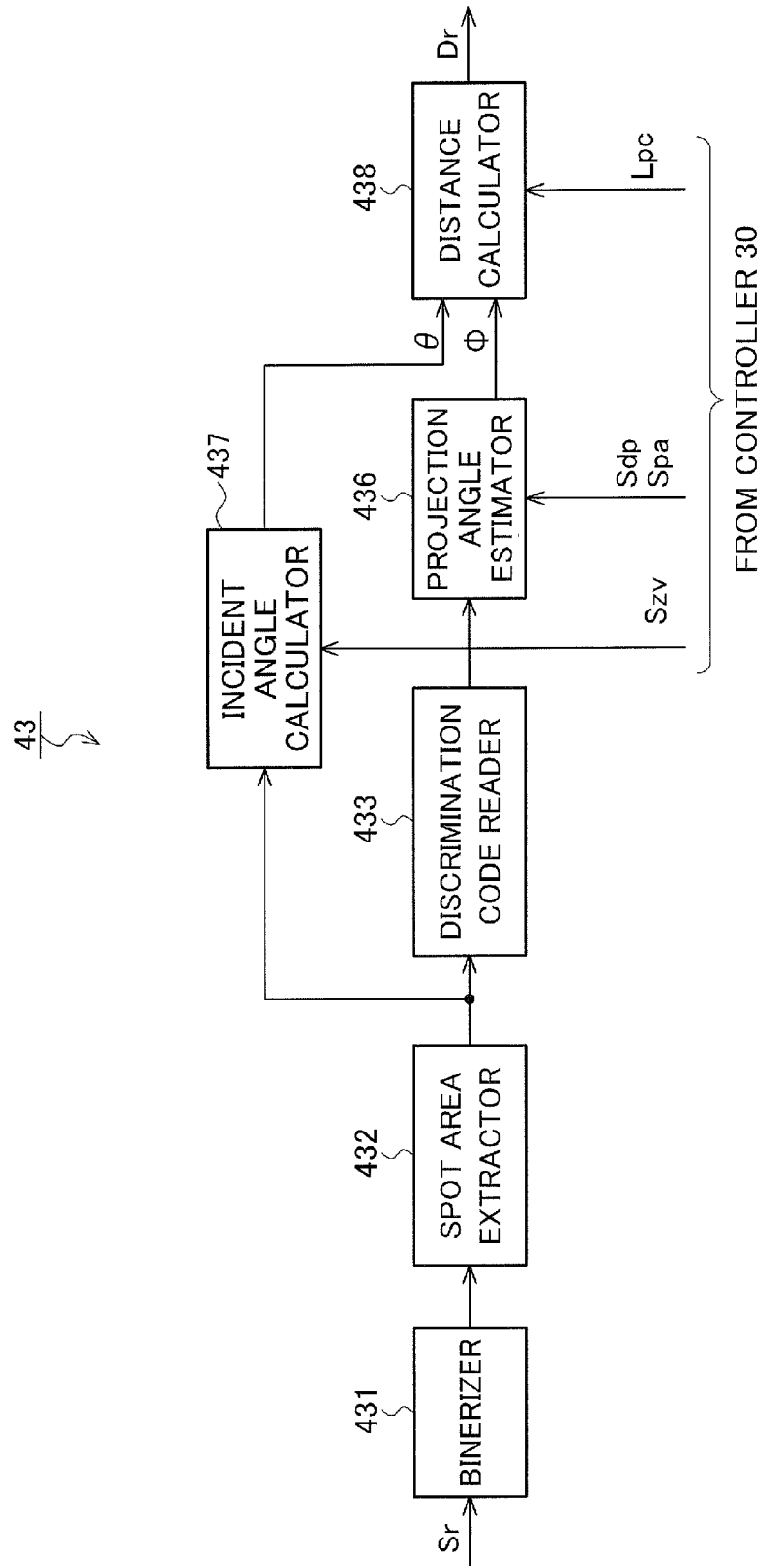
FIG. 11 is a block diagram illustrating an example of a configuration of a distance information generator 43 in FIG. 1.

FIG. 11 illustrates an example of a configuration of the distance information generator 43.

The distance information generator 43 illustrated in FIG. 11 includes a binarizer 431, a spot area extractor 432, a discrimination code reader 433, a storage unit 434, a projection angle estimator 436, an incident angle calculator 437, and a distance calculator 438.

The binarizer 431 binarizes the pattern light component output from the image difference acquisition unit 42 and outputs a binary pattern light image.

The spot area extractor 432 extracts, from the pattern light image, the spot areas MA (four-row, four-column areas in FIG. 8) with the respective light spots at their centers.

To extract the spot areas MA, it searches for four-row, four-column cell groups that are arranged at regular intervals and that each consist of four dots (formed by cells in the on state) arranged in two rows and two columns at the center and cells in the off state located around (in the row on the upper side, the row on the lower side, the column on the left side, and the column on the right side) of the four dots. Since the groups of four dots arranged in two rows and two columns at the center are regularly spaced at equal intervals in the projection pattern, the condition that the groups of four dots are arranged similarly in the image obtained by imaging is required. However, in the imaged image, due to curvature, bumps, steps, or the like in the surface of the object, the intervals are not necessarily exactly equal, so the spot areas MA are extracted by performing pattern matching or the like based on degree of similarity.

The discrimination code reader 433 reads the discrimination codes DC from the discrimination code areas adjacent to the extracted spot areas MA.

The projection angle estimator 436 receives the results of the reading of the discrimination codes from the discrimination code reader 433, and further obtains, from the controller 30, data Sdp indicating the content of the table in FIG. 9 (information indicating the relation between the discrimination codes and positions in the projection pattern) and information Spa indicating the correspondence relation between positions in the projection pattern and projection angles, and estimates the projection angle φ of each light spot on the basis of the received results, data, and information. When the above information, that is, the data Sdp indicating the content of the table in FIG. 9 and the information Spa indicating the correspondence relation between positions in the projection pattern and projection angles, is supplied from the controller 30, these information items may be held in a memory (not illustrated) in the projection angle estimator 436.

The projection angle estimator 436 estimates the projection angles based on the results of the reading by the discrimination code reader 433.

The projection angle estimation determines which one of the discrimination codes No. 0 to No. 55 in the table of FIG. 9 the value of the read discrimination code DC matches (i.e., determines which one of the light spots in the pattern it is assigned to), and on the basis of this determination result and a result of determination of the position of the light spot in the up-down direction, identifies the position of the light spot in the horizontal direction and up-down direction in the projection pattern.

When the position of the light spot in the projection pattern has been identified, the projection angle φ is obtained based on the information Spa (supplied from the controller 30) indicating the relationship between the identified position and the projection angle.

On the basis of the output of the spot area extractor 432, the position in the imaging surface at which the light spot is imaged, and the axial direction and angle of view of the imager, the incident angle calculator 437 calculates the incident angle θ of the light spot. Information Szv indicating the axial direction and angle of view is supplied from the controller 30.

On the basis of the projection angle φ estimated by the projection angle estimator 436, the incident angle θ calculated by the incident angle calculator 437, and the base line length Lpc supplied from the controller 30, the distance calculator 438 calculates the distance from the base line BL to the surface of the object onto which the light spot is projected.

First, the distance Dz from the base line BL in FIG. 4 to the surface of the object onto which the light spot is projected (the point at which the spot SP is formed), that is, the position of the spot SP in FIG. 4, can be obtained from the following relation:

$$Dz = Lpc/(\tan \phi - \tan \theta). \quad (2)$$

Equation (2) is obtained from the following relation in FIG. 4:

$$Dz \cdot \tan \phi - Dz \cdot \tan \theta = Lpc. \quad (3)$$

Next, the distance Dr from the imager 20 to the surface of the object onto which the light spot is formed (spot SP) is obtained from the distance Dz to the base line BL obtained by equation (3) and the incident angle θ according to the following equation:

$$Dr = Dz/\cos \theta. \quad (4)$$

The distance information Dr obtained by the distance information generator 43 is supplied to the display processor 49.

The ambient light type determiner 44 determines the type of ambient light from the information Prp that indicates the proportion of the R, G, and B components and is output from the controller 30. Ambient light is classified into natural light such as sunlight and artificial illumination light; artificial light is further classified depending on the type of light source. For example, the ambient light type determiner 44 compares the proportion Prp of the R, G, and B components with one or more predetermined determination reference values and determines the type of ambient light on the basis of the result of the comparison.

The type determination result Ltp by the ambient light type determiner 44 is transmitted to the visible light image generator 46.

The visible light image generator 46 calculates, based on the pixel values R1, G1, and B1 from the image difference acquisition unit 42 and the type determination result Ltp from the ambient light type determiner 44, pixel values obtained by removing the near-infrared components IRre, IRge, and IRbe from the pixel values R1, G1, and B1, i.e., values (pixel values) R2, G2, and B2 of the R, G, and B components in the visible region.

The general operation of the visible light image generator 46 will be described below with reference to FIGS. 12(*a*) to 12(*c*). FIGS. 12(*a*), 12(*b*), and 12(*c*) are respectively similar to FIGS. 6(*e*), 6(*k*), and 6(*p*), but indicate, by dotted lines, values of the respective components when the reflectance of the object is 100%. In the following description, "(100)" will be added to individual values when the reflectance M is 100%, like G1(100), Gg(100), IRge(100), Y1(100), Yy(100), and IRyp(100). On the other hand, "(M)" may be added to values when the reflectance M is not particularly specified, in order to clarify differences, like G1(M), Gg(M), IRge(M), Y1(M), Yy(M), and IRyp(M); "(M)" may be omitted.

The visible light image generator 46 estimates, from the information Ltp indicating the type from the ambient light type determiner 44, a proportion or component ratio Ey of a near-infrared component in the ambient light image (R1, G1, and B1) on the assumption that the reflectance to near-infrared light and the reflectance to visible light (here, in particular, the G component) are the same value Mo.

This embodiment estimates, as the component ratio Ey, the ratio of the near-infrared component IRge(Mo) included in the value G1(Mo) of the G signal of an ambient light image to the luminance value Y1(Mo) (=IRye(Mo)+Yy(Mo)).

Although the same result is obtained regardless of the value of the reflectance Mo, in order to simplify the explanation, the following description assumes that the reflectance Mo is 100%. When the reflectance Mo is 100%, the component ratio Er ratio Ey is given by the following equation:

$$Ey = IRge(100)/Y1(100)$$
$$= IRge(100)/\{IRye(100) + Yy(100)\}.$$

The visible light image generator 46 obtains the near-infrared component IRge(M) included in the pixel value G1(M) by multiplying the luminance value Y1(M) by the component ratio Ey, and obtains the pixel value G2(M) (=Gg(M)) by subtracting the near-infrared component IRge(M) from the pixel value G1(M).

In calculation of the pixel values R2(M) (=Rr(M)) and B2(M) (=Bb(M)), values (α×Ey and β×Ey) obtained by multiplying the component ratio Ey by parameters α and β that take into account difference in ratio of the near-infrared component between the R, G, and B components are used instead of the component ratio Ey.

Figure 13:
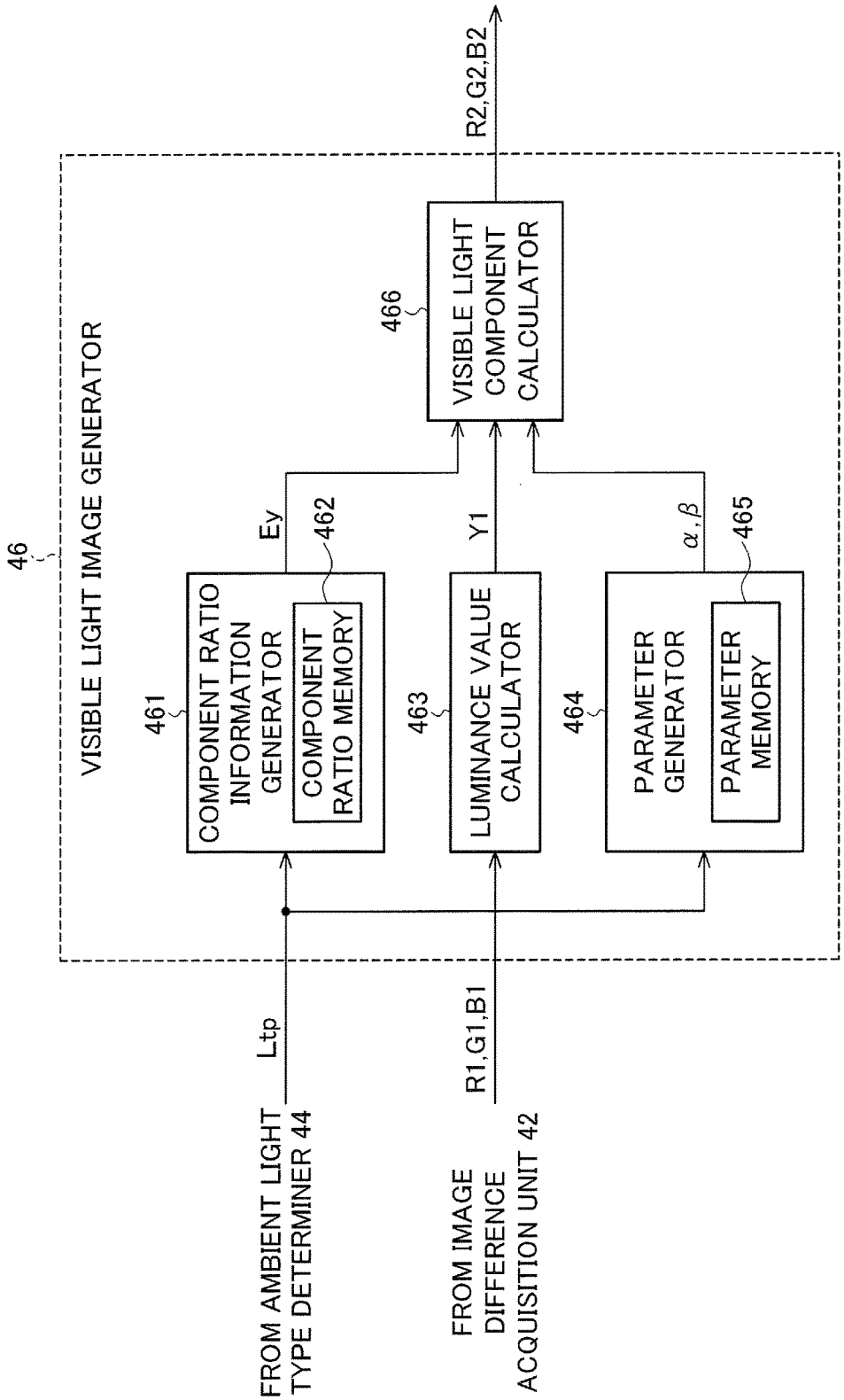
FIG. 13 is a block diagram illustrating an example of a configuration of a visible light image generator 46 in FIG. 1.

FIG. 13 is an example of a configuration of the visible light image generator 46 in FIG. 1.

The illustrated visible light image generator 46 includes a component ratio information generator 461, a luminance value calculator 463, a parameter generator 464, and a visible light component calculator 466.

The component ratio information generator 461 generates, from the type determination result Ltp by the ambient light type determiner 44, information (component ratio information) indicating the component ratio Er of the near-infrared component in a pixel value of the ambient light image.

For such processing, the component ratio information generator 461 includes a component ratio memory 462 that holds, for each type of ambient light, information indicating the component ratio of the near-infrared component included in ambient light. For example, the component ratio memory 462 includes a LUT table and is configured so that when information indicating an ambient type is input as an address, information indicating the component ratio of the near-infrared light is read out.

The "component ratio of the near-infrared component included in ambient light" depends on the spectral transmission characteristics of the color filters of the imager 20 and the spectral sensitivity characteristics of the photoelectric conversion elements, and means the component ratio of the near-infrared component in an output value of the imager 20 due to ambient light. For example, when it is assumed that the reflectance of the object to visible light and the reflectance of the object to near-infrared light are the same value Mo, the ratio (IRge(Mo)/Y1(Mo)) of the near-infrared component IRge(Mo) included in a pixel value G1(Mo) of the G component in an ambient light image to the luminance value Y1(Mo) (=Yy(Mo)+IRye(Mo)) is held in the component ratio memory 462 as the component ratio Ey. The case in which the reflectance Mo is 100% will be described with reference to FIGS. 12(*a*) to 12(*c*); the component ratio Ey is the ratio (IRge(100)/Y1(100)) of the near-infrared component IRge(100) included in a pixel value G1(100) of the G component in an ambient light image illustrated in FIG. 12(*a*) to the luminance value Y1(100) (=Yy(100)+IRye(100)) illustrated in FIG. 12(*b*).

As described above, the ambient light type determiner 44 receives the information Prp that is included in control information and indicates the proportion (proportion for the entire image plane) of the R, G, and B components, and based on this, determines the type Ltp of ambient light; the component ratio information generator 461 reads and outputs information indicating the component ratio Ey corresponding to the type Ltp (stored in association with the type) with reference to the component ratio memory 462.

The information indicating the component ratio Ey is obtained for the entire image plane only once, and is used for every pixel or area in the image plane as a common value, for example.

If information Prp indicating the proportion of the R, G, and B components is obtained for each of multiple areas of the image plane, based on this, the component ratio Ey may be obtained for each area, instead of being obtained for the entire image plane only once.

The luminance value calculator 463 calculates, based on the pixel values R1, G1, and B1 output from the imager 20, the luminance value Y1(M) for the pixel.

The luminance value can be calculated by, for example, the following equation:

$$Y1(M)=ar \times R1(M)+ag \times G1(M)+ab \times B1(M). \quad (5)$$

ar, ag, and ab are coefficients predetermined so that ar+ag+ab=1 is satisfied, and for example, $$ar=0.3,$$
$$ag=0.59,$$
$$ab=0.11.$$

The type determination result Ltp by the ambient light type determiner 44 is also transmitted to the parameter generator 464.

The parameter generator 464 includes a parameter memory 465 that holds the parameters α and β for each ambient light. The parameter generator 464 reads, from the parameter memory 465, the values of the parameters α and β corresponding to the type according to the type determination result Ltp by the ambient light type determiner 44 and outputs them.

The parameter α indicates the ratio (IRre(100)/IRge(100)) of the value IRre(100) of the near-infrared component included in a pixel value R1(100) of the R component in an ambient light image to the value IRge(100) of the near-infrared component included in a pixel value G1(100) of the G component when an object is illuminated with the corresponding type of ambient light and the reflectance of the object is a certain value Mo, e.g., 100%.

The parameter β indicates the ratio (IRbe(100)/IRge(100)) of the value IRbe(100) of the near-infrared component included in a pixel value B1(100) of the B component in an ambient light image to the value IRge(100) of the near-infrared component included in a pixel value G1(100) of the G component when an object is illuminated with the corresponding type of ambient light and the reflectance of the object is a certain value Mo, e.g., 100%.

The values of α and β depend on the characteristics of the color filters and photoelectric conversion elements in the imager, and are predetermined by experiment.

The visible light component calculator 466:

obtains the near-infrared component (IRge=Y1×Ey) included in the G signal of the ambient light image by multiplying the luminance value Y1 from the luminance value calculator 463 by the component ratio Ey from the component ratio information generator 461;

obtains the near-infrared component (IRre=Y1×Ey×α) included in the R signal of the ambient light image by multiplying the value (IRge=Y1×Ey) by the parameter α; and obtains the near-infrared component (IRbe=Y1×Ey×β) included in the B signal of the ambient light image by multiplying the value (IRge=Y1×Ey) by the parameter β.

By subtracting the thus obtained near-infrared components IRre, IRge, and IRbe included in the R signal, G signal, and B signal of the ambient light image from the R signal, G signal, and B signal of the ambient light image, the visible light component calculator 466 calculates the visible light components (values obtained by removing the near-infrared components) R2, G2, and B2.

The above calculation is represented by the following equations:

$$R2 = R1 - Y1 \times Ey \times \alpha,$$

$$G2 = G1 - Y1 \times Ey,$$

$$B2 = B1 - Y1 \times Ey \times \beta. \quad (6)$$

The intensifying processor 47 performs intensification or amplification processing on the visible light image generated by the visible light image generator 46 and outputs an intensified visible light image. This intensifying processing is performed by weighting the pixel values of one or more peripheral pixels and adding the weighted pixel values to the pixel values R2, G2, and B2 output from the visible light image generator 46.

Regarding the pixel values R2, G2, and B2 output from the visible light image generator 46, each pixel has the value of one of the color components depending on its position in the Bayer arrangement, instead of having all of the color components. The intensifying processor 47 outputs signals R3, G3, and B3 having intensified pixel values by adding, for each pixel (pixel of interest), the pixel values of one or more pixels peripheral to and of the same color as the pixel of interest (pixels having the same color component).

FIGS. 14(a) to 14(c) each illustrate pixels to be added to the pixel of interest. In FIGS. 14(a) to 14(c), each of the smallest squares represents a pixel.

If the pixel of interest is the R pixel RR34 as illustrated in FIG. 14(a), the following eight pixels are added as the peripheral pixels: the pixel RR12 two rows above and two columns to the left of the pixel RR34, the pixel RR32 two rows above and in the same column as the pixel RR34, the pixel RR52 two rows above and two columns to the right of the pixel RR34, the pixel RR14 in the same row as and two columns to the left of the pixel RR34, the pixel RR54 in the same row as and two columns to the right of the pixel RR34, the pixel RR16 two rows below and two columns to the left of the pixel RR34, the pixel RR36 two rows below and in the same column as the pixel RR34, and the pixel RR56 two rows below and two columns to the right of the pixel RR34.

Thus, the addition result NRR34 is represented by the following equation:

$$NRR34 = RR12 + RR32 + RR52 + \\ RR14 + RR34 + RR54 + RR16 + RR36 + RR56. \quad (7)$$

The value NRR34 resulting from such pixel addition is output as the intensified R component value R3.

While the above describes the case in which the pixel of interest is RR34, for the R pixels at the other positions, the peripheral pixels at the same locations are added.

If the pixel of interest is the G pixel GB33 as illustrated in FIG. 14(b), the following eight pixels are added as the peripheral pixels: the pixel GB31 two rows above and in the same column as the pixel GB33, the pixel GR22 one row above and one column to the left of the pixel GB33, the pixel GR42 one row above and one column to the right of the pixel GB33, the pixel GB13 in the same row as and two columns to the left of the pixel GB33, the pixel GB53 in the same row as and two columns to the right of the pixel GB33, the pixel GR24 one row below and one column to the left of the pixel GB33, the pixel GR44 one row below and one column to the right of the pixel GB33, and the pixel GB35 two rows below and in the same column as the pixel GB33.

Thus, the addition result NGB33 is represented by the following equation:

$$NGB33 = GB31 + GR22 + GR42 + \\ GB13 + GB33 + GB53 + GR24 + GR44 + GB35. \quad (8)$$

The value NGB33 resulting from such pixel addition is output as the intensified G component value G3.

While the above describes the case in which the pixel of interest is GB33, for the G pixels at the other positions, the peripheral pixels at the same locations are added.

If the pixel of interest is the B pixel BB43 as illustrated in FIG. 14(c), the following eight pixels are added as the peripheral pixels: the pixel BB21 two rows above and two columns to the left of the pixel BB43, the pixel BB41 two rows above and in the same column as the pixel BB43, the pixel BB61 two rows above and two columns to the right of the pixel BB43, the pixel BB23 in the same row as and two columns to the left of the pixel BB43, the pixel BB63 in the same row as and two columns to the right of the pixel BB43, the pixel BB25 two rows below and two columns to the left of the pixel BB43, the pixel BB45 two rows below and in the same column as the pixel BB43, and the pixel BB65 two rows below and two columns to the right of the pixel BB43.

Thus, the addition result NBB43 is represented by the following equation:

$$NBB43 = BB21 + BB41 + BB61 + \\ BB23 + BB43 + BB63 + BB25 + BB45 + BB65. \quad (9)$$

The value NBB43 resulting from such pixel addition is output as the intensified B component value B3.

While the above describes the case in which the pixel of interest is BB43, for the B pixels at the other positions, the peripheral pixels at the same locations are added.

The addition processing as above is processing for combining the pixel of interest with its peripheral pixels in the same frame and the peripheral pixels typically have about the same pixel value as the pixel of interest, so the addition processing has an effect of intensifying a signal component.

For example, when the pixel values of the eight peripheral pixels are added to each pixel of interest as described above, (if it is assumed that the peripheral pixels have the same pixel value as the pixel of interest), the addition result is nine times the pixel value of the pixel of interest.

However, the addition (combination) of the peripheral pixels reduces resolution (static resolution).

To prevent the reduction in resolution, in adding pixel values, instead of adding peripheral pixels equally, the addition weight may be changed depending on the peripheral pixel value. For example, it is possible to perform weighted addition so that the weight applied to the pixel value of a pixel having stronger correlation with the pixel of interest is greater. For example, it is possible to compare the pixel values of the peripheral pixels with the pixel value of the pixel of interest, increase the addition weights for only pixels having a pixel value whose difference from the pixel value of the pixel of interest is equal to or less than a predetermined value, and decrease the addition weights for the other pixels. With such processing, even when there is a sharp change in the pixel value near the pixel of interest due to an edge of an object, reduction in resolution due to addition of the peripheral pixels can be reduced.

Further, instead of adding peripheral pixels in the same frame to the pixel of interest, it is also possible to add the pixels at the same position as the pixel of interest in different frames, that is, frames preceding and following the frame including the pixel of interest.

Here, the preceding and following frames are not limited to the single immediately preceding frame and the single immediately following frame, and may be a predetermined number of immediately preceding frames and a predetermined number of immediately following frames.

Adding the pixels at the same position in different frames can intensify the signal component while preventing reduction in static resolution, and is particularly effective for images with little motion.

However, in images with rapid motion, much motion blur occurs.

Further, it is possible to add, to the pixel of interest, both of peripheral pixels in the same frame and the pixels at the same position in different frames, and it is also possible to add pixels peripheral to the pixels at the same position in different frames.

This makes it possible to further increase the intensification rate of the signal component.

The image signal processor 48 applies, to the intensified visible light image output from the intensifying processor 47, a color interpolation process (interpolation of the color components missing at the position of each pixel), a gray level correction process, a noise reduction process, a contour correction process, a white balance adjustment process, a signal amplitude adjustment process, a color correction process, or the like, and outputs the image obtained from these processes as a corrected visible light image R4, G4, and B4.

The display processor 49 performs processing for displaying the corrected visible light image output from the image signal processor 48 in association with the distance information generated by the distance information generator 43.

Figure 15A:
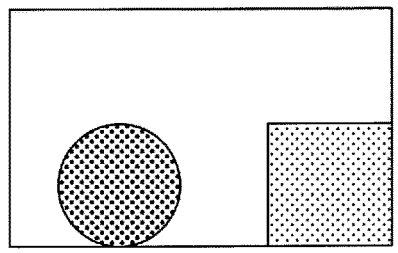
FIGS. 15(a) and 15(b) illustrate examples of an output image from a display processor in FIG. 1.
Figure 15B:
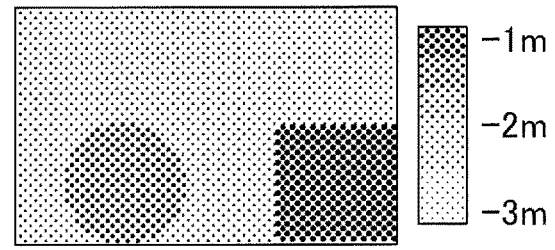

FIGS. 15(a) and 15(b) illustrate exemplary images output by the display processor 49. FIG. 15(a) illustrates a visible light image (image without projection), and FIG. 15(b) illustrates an image with distance information.

As the image with distance information, an image with brightnesses or colors assigned to distances is displayed. For example, an image in which the visible light image is represented by brightness and distance is represented by color is displayed. Alternatively, an object present in the imaging space is recognized and an image in which text information expressing the distance to the object is superimposed on the visible light image and displayed is output.

Further, for example, two display screens may be used so that the visible light image in FIG. 15(a) is displayed on one of them and the image with distance information illustrated in FIG. 15(b) is displayed on the other; or the visible light image illustrated in FIG. 15(a) and the image with distance information illustrated in FIG. 15(b) may be displayed alternately on a single display screen; or the image selected by a user operation may be displayed. In this case, the image with distance information is preferably displayed in synchronization with the visible light image, with the same angle of view and number of pixels.

The (signal indicating the) image associated with the distance information is output to a display device (not illustrated) or the like.

Second Embodiment

Figure 16:
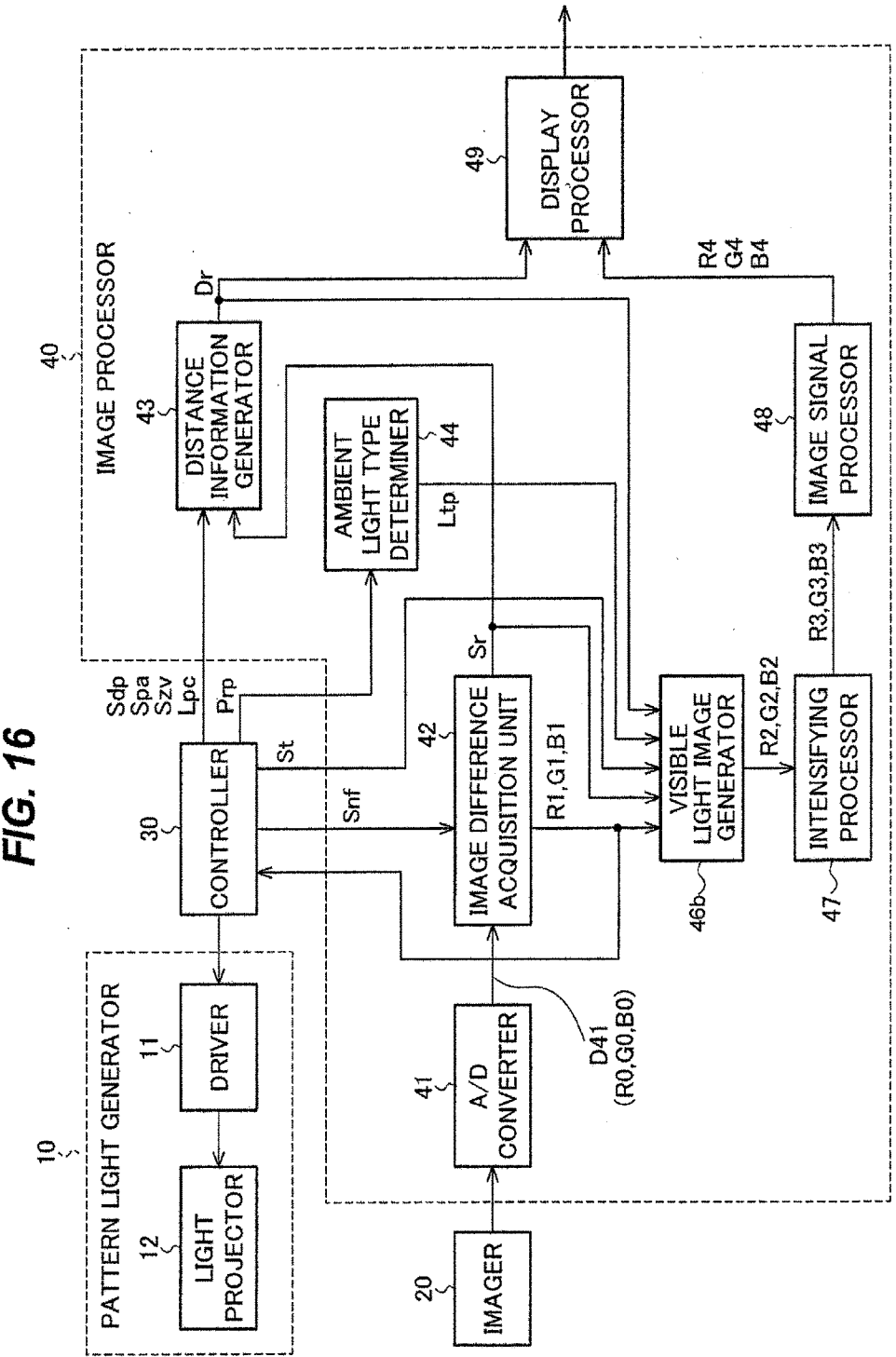
FIG. 16 is a block configuration diagram illustrating an image generation device in a second embodiment of the present invention.

FIG. 16 illustrates a configuration of an image generation device in a second embodiment of the present invention. The configuration of the illustrated image generation device is generally the same as the configuration illustrated in FIG. 1, but differs in the following point: a visible light image generator 46b is provided in place of the visible light image generator 46 in FIG. 1.

While the first embodiment obtains the component ratio Ey of the near-infrared component included in a value of the G component in an ambient light image to the luminance value, and calculates pixel values R2, G2, and B2 including only the visible light components on the basis of the pre-stored parameters α and β and the component ratio Ey, by the visible light image generator 46, the second embodiment calculates a pixel value R2 by using a component ratio (first component ratio) Er of the near-infrared component IRre included in a value of the R signal of an ambient light image, calculates a pixel value G2 by using a component ratio (second component ratio) Eg of the near-infrared component IRge included in a value of the G signal of an ambient light image, and calculates a pixel value B2 by using a component ratio (third component ratio) Eb of the near-infrared component IRbe included in a value of the B signal of an ambient light image.

Figure 17:
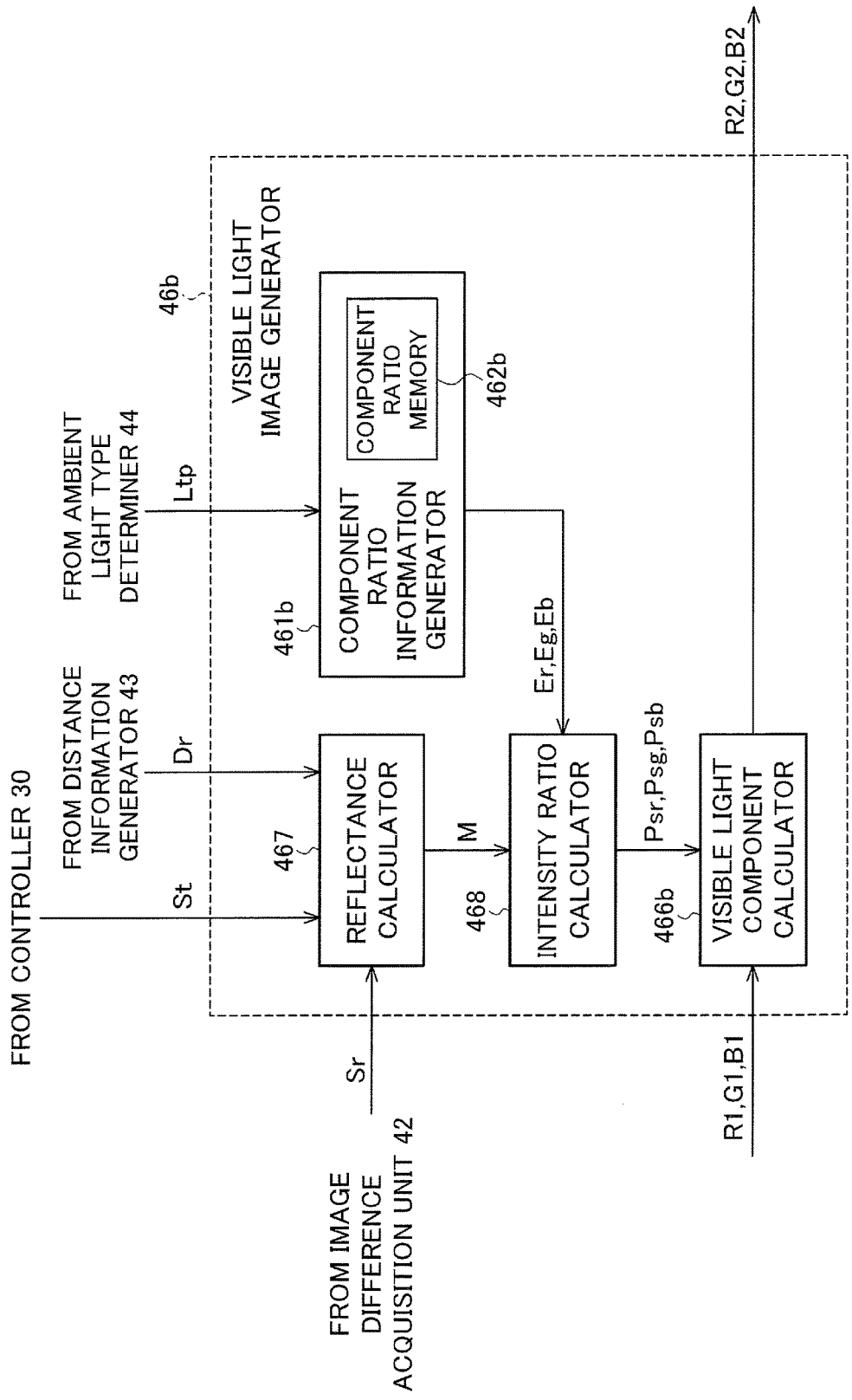
FIG. 17 is a block diagram illustrating an example of a configuration of a visible light image generator 46b in FIG.

FIG. 17 illustrates the visible light image generator 46b used in the second embodiment.

The visible light image generator 46b in FIG. 17 includes a component ratio information generator 461b, a reflectance calculator 467, an intensity ratio calculator 468, and a visible light component calculator 466b.

The component ratio information generator 461b includes a component ratio memory 462b. The component ratio memory 462b stores, for each type of ambient light, information (component ratio information) indicating the component ratios Er, Eg, and Eb of the near-infrared components IRre, IRge, and IRbe included in pixel values R1, G1, and B1 of the R, G, and B components of an ambient light image.

The component ratios Er, Eg, and Eb are respectively represented by the following equations:

$$Er = IRre(Mo)/R1(Mo),$$

$$Eg = IRge(Mo)/G1(Mo),$$

$$Eb = IRbe(Mo)/B1(Mo).$$

In the above equations, Mo denotes the reflectance of an object; as described in the first embodiment, if Mo=100%, the above equations can be rewritten as follows:

$$Er = IRre(100)/R1(100),$$

$$Eg = IRge(100)/G1(100),$$

$$Eb = IRbe(100)/B1(100).$$

The component ratio information generator 461b reads, from the component ratio memory 462b, information indicating the component ratios Er, Eg, and Eb corresponding to the type Ltp determined by the ambient light type determiner 44, and outputs it.

On the basis of the value (indicating the intensity of the part of the pattern light that has been reflected by an object and entered the imager 20) Sr of the pattern light component output from the image difference acquisition unit 42, (information indicating) a pattern light projection intensity St supplied from the controller 30, and the distance information Dr of the object calculated by the distance information generator 43, the reflectance calculator 467 obtains, for each area in the image, the reflectance M of the object to the near-infrared component and outputs information (reflectance information) M indicating the reflectance.

This reflectance is obtained, for example, as follows.

As described above, the controller 30 controls the light projection intensity of the light projector 12, and for this purpose, it generates information indicating the light projection intensity. This information for the control indicating the light projection intensity St is supplied to the visible light image generator 46b.

From the light projection intensity St of the pattern light and the distance information Dr, it is possible to estimate the intensity of reflected light reaching the imager 20 when it is assumed that the reflectance of the object to the pattern light is 100%. The estimation of the intensity of the reflected light reaching the imager 20 is performed based on the distance Dr from the object to the imager 20.

Specifically, when the reflectance of an object is 100%, the intensity (or the value of the imaging signal corresponding to the intensity) Sr0 of light that is reflected by the object, reaches the imager, and is received by the imager is given by the following equation:

$$Sr0 = St \times (Ka/Dr^2). \tag{10}$$

In equation (10), ka is a constant determined by the numerical aperture of the lens 22 in the imager 20 and the sensitivity of the imaging element 24.

When the projection pattern is projected by using the combination of the laser light source 13 and diffraction grating 16 as described above, each of the dots constituting the pattern is formed by a single point of laser light collimated by the collimator lens 14, so the size of the dot itself does not depend on the distance to the object. Thus, it can be assumed that there is no attenuation during propagation from the light projector 12 to the object. Further, there is attenuation due to diffusion by particles in the air, but it can be ignored compared to the attenuation determined by equation (10).

Meanwhile, if it is assumed that the intensity of light actually reaching the imager 20 is Sr, then the reflectance M is given by:

$$M = Sr/Sr0. \tag{11}$$

The intensity Sr of the actual reflected light can be obtained from the difference between the luminance of an image captured when the pattern light is projected and the luminance of an image captured when no pattern light is projected. That is, the magnitude of the pattern light component output from the image difference acquisition unit 42, i.e., IRyp(M) in FIG. 12(c), indicates the intensity Sr of the reflected light. OJ1 the other hand, Sr0 corresponds to IRyp(100) in FIG. 12(c).

The intensity of the reflected light is obtained for each spot in each frame, so the above reflectance M is obtained for each of the areas in the image corresponding to each spot.

It is also possible to divide the image into multiple areas and for each area, use the average (simple average or weighted average) Ma of the reflectances pertaining to spots included in the area as the reflectance M pertaining to each of the spots in the area.

Instead of obtaining the reflectance for each area, it is also possible to obtain the reflectance for each pixel. For example, for each pixel, the average (simple average or weighted average) Mp of the reflectances pertaining to spots included in an area centered at the pixel may be used as the reflectance M pertaining to the pixel.

The intensity ratio calculator 468 calculates and outputs intensity ratios Psr, Psg, and Psb of R, G, and B by multiplying the component ratios Er, Eg, and Eb by the reflectance M. The intensity ratios Psr, Psg, and Psb represent the ratios (IRre(M)/R1(100), IRge(M)/G1(100), IRbe(M)/B1(100)) of the near-infrared components included in pixel values (pixel values output from the imager 20) of R, G, and B in each area in the image.

The visible light component calculator 466b obtains the near-infrared components IRre (=R1×Psr), IRge (=G1×Psg), and IRbe (=B1×Psb) included in the R, G, and B signals of ambient light by multiplying the intensity ratios Psr, Psg, and Psb by the pixel values R1, G1, and B1 of the ambient light image, and calculates pixel values (values obtained by removing the near-infrared components) R2, G2, and B2 including only the visible light components by subtracting the obtained near-infrared components from the pixel values R1, G1, and B1 of the ambient light image.

The calculation for calculating the pixel values R2, G2, and B2 in the visible light component calculator 466b is represented by the following equations:

$$R2 = R1 - R1 \times Psr,$$

$$G2 = G1 - G1 \times Psg,$$

$$B2 = B1 - B1 \times Psb. \tag{12}$$

The pixel values R2, G2, and B2 of the visible light image obtained as above are supplied to the intensifying processor 47. Except for the above, the second embodiment is the same as the first embodiment.

In the above first and second embodiments, the proportion Prp of the R, G, and B components is obtained based on the signals R1, G1, and B1 output from the image difference acquisition unit 42; however, the present invention is not limited to this, and the proportion Prp may be obtained based on the signals R2, G2, and B2 output from the visible light image generator 46, the signals R3, G3, and B3 output from the intensifying processor 47, the signals R4, G4, and B4 output from the image signal processor 48, or the signals R0, G0, and B0 output from the A/D converter 41.

In the above first and second embodiments, the laser is used as the light source of the light projector 12; however, even when another light source, such as an LED, is used in place of the laser, if characteristics of incident light of the diffraction grating are satisfied, similar operation and similar advantages can be obtained.

In the above first and second embodiments, as the light projector 12, the configuration that projects a pattern formed on the diffraction grating 16 by the laser light source 13; however, even when it is configured to project a pattern by two-dimensionally scanning with laser light at high speed (by scanning the entire field of view within one frame period), similar operation and similar advantages can be obtained.

In the above first and second embodiments, the light projector 12 projects pattern light in alternate frame periods; however, the present invention is not limited to this, projection of pattern light may be performed at intervals of two frame periods or more; that is, it should be performed at intervals of a predetermined number of frame periods.

When the light projector 12 projects pattern light at intervals of two frame periods or more, multiple images without projection are obtained for each image with projection. In this case, for example, for each image with projection, the image difference acquisition unit 42 may generate a pattern light image from the difference between the image with projection and the image without projection obtained in the frame period immediately preceding or following the frame period in which the image with projection is obtained. Further, if the image has no motion, for each image with projection, a pattern light image may be generated from the difference between the image with projection and the average of the images without projection obtained in multiple frame periods preceding and following the frame period in which the image with projection is obtained.

As above, the present invention provides an image generation device capable of obtaining information about the distance to an object present in the imaging space in association with the imaged image. The image generation device of the present invention can simultaneously obtain, for example, an image of an intruder and the intruder's distance, so it is applicable to intrusion monitoring in monitoring application. The image generation device of the present invention is also applicable to, for example, driving assistance, such as parking assistance, based on detection of obstacles in front of or behind a vehicle.

Further, by estimating the reflectance of an object to near-infrared light and the component ratios of the near-infrared light included in ambient light on the basis of the pattern light projection intensity, the distance to the object, and information on the ratio of the R, G, and B components in the captured image, and correcting pixel values, even when an imager having sensitivity to near-infrared light is used, it is possible to remove the near-infrared component and obtain an image with high color reproducibility.

Further, by performing signal intensification by pixel addition with peripheral pixels on the image having the corrected pixel values, it is possible to prevent reduction in image brightness due to correction of the pixel values. In this case, by giving a greater weight to a pixel value having a stronger correlation with the pixel of interest and adding it, it is possible to reduce reduction in resolution.

While the image generation device of the present invention has been described above, the image generation method performed by the above image generation device also forms a part of the present invention. Further, different parts of the image generation device or a subset of the steps constituting the image generation method can be implemented by software, i.e., a programmed computer.

DESCRIPTION OF REFERENCE CHARACTERS

10 pattern light generator, 11 driver, 12 light projector, 20 imager, 24 imaging element, 30 controller, 40 image processor, 41 A/D converter, 42 image difference acquisition unit, 43, distance information generator, 44 ambient light type determiner, 46, 46*b* visible light image generator, 47 intensifying processor, 48 image signal processor, 49 display processor, 421 frame delay unit, 422 difference calculator, 424 interpolator, 425 combiner, 431 binarizer, 432 spot area extractor, 433 discrimination code reader, 436 projection angle estimator, 437 incident angle calculator, 438 distance calculator, 461, 461*b* component ratio information generator, 462, 462*b* component ratio memory, 463 luminance calculator, 464 parameter generator, 465 parameter memory, 466, 466*b* visible light component calculator, 467 reflectance calculator, 468 intensity ratio calculator.

What is claimed is:

1. An image generation device comprising:
   a light projector for projecting pattern light of a near-infrared wavelength into an imaging space at intervals of a predetermined number of frame periods;
   an imager for imaging an object in the imaging space and outputting an imaging signal including an R signal, a G signal, and a B signal respectively representing an R component, a G component, and a B component of an imaged image, the object being illuminated by ambient light and subjected to projection of the pattern light at intervals of the predetermined number of frame periods;
   a controller for providing the light projector with an instruction on a projection intensity of the pattern light;
   an image difference acquisition unit for generating a pattern light image by obtaining a difference between the imaging signal obtained when the pattern light is projected and the imaging signal obtained when the pattern light is not projected, of the imaging signal obtained by imaging by the imager, and generating an ambient light image from the imaging signal obtained when the pattern light is not projected;
   an ambient light type determiner for determining a type of the ambient light; and
   a visible light image generator for generating, from the type of the ambient light determined by the ambient light type determiner, component ratio information indicating a component ratio of near-infrared light included in the ambient light, estimating a component due to the near-infrared light included in the ambient light in the ambient light image on a basis of the generated component ratio information, and generating a visible light image by subtracting the component due to the near-infrared light from the ambient light image,
   wherein the ambient light type determiner determines the type of the ambient light from a proportion of R, G, and B components in the imaged image, the ambient light image, or the visible light image.

2. The image generation device of claim 1, wherein:
   the component ratio is a ratio of a component due to near-infrared light included in a value of a G signal of the ambient light image with respect to a luminance value of the ambient light image; and the visible light image generator obtains a value of a G signal of the visible light image by subtracting a product of the component ratio and the luminance value of the ambient light image from the value of the G signal of the ambient light image.

3. The image generation device of claim 2, wherein the visible light image generator:

generates, in accordance with the type of the ambient light determined by the ambient light type determiner, a first parameter indicating a ratio of a value of a component due to near-infrared light included in a value of an R signal of the ambient light image with respect to a value of the component due to the near-infrared light included in the value of the G signal of the ambient light image, and a second parameter indicating a ratio of a value of a component due to near-infrared light included in a value of a B signal of the ambient light image with respect to a value of the component due to the near-infrared light included in the value of the G signal of the ambient light image;

obtains a value of an R signal of the visible light image by subtracting a product of the component ratio, the first parameter, and the luminance value of the ambient light image from the value of the R signal of the ambient light image; and obtains a value of a B signal of the visible light image by subtracting a product of the component ratio, the second parameter, and the luminance value of the ambient light image from the value of the B signal of the ambient light image.

4. The image generation device of claim 3, further comprising an intensifying processor for adding, to a value of a signal of each pixel in the visible light image generated by the visible light image generator, values of signals of peripheral pixels after weighting the values, thereby intensifying the value of the signal of each pixel.

5. The image generation device of claim 2, further comprising an intensifying processor for adding, to a value of a signal of each pixel in the visible light image generated by the visible light image generator, values of signals of peripheral pixels after weighting the values, thereby intensifying the value of the signal of each pixel.

6. The image generation device of claim 1, further comprising a distance information generator for generating distance information indicating a distance from the imager to the object on a basis of the pattern light image generated by the image difference acquisition unit, wherein the component ratio information indicates:

a first component ratio that is a ratio of a component due to near-infrared light included in a value of an R signal of the ambient light image;

a second component ratio that is a ratio of a component due to near-infrared light included in a value of a G signal of the ambient light image; and a third component ratio that is a ratio of a component due to near-infrared light included in a value of a B signal of the ambient light image, wherein the visible light image generator:

estimates a reflectance of the object from the type of the ambient light determined by the ambient light type determiner, the projection intensity of the pattern light by the light projector, a value of a signal of the pattern light image generated by the image difference acquisition unit, and the distance information generated by the distance information generator;

calculates a component due to near-infrared light included in the R signal of the ambient light image by multiplying the estimated reflectance, the first component ratio, and the value of the R signal of the ambient light image;

calculates a component due to near-infrared light included in the G signal of the ambient light image by multiplying the estimated reflectance, the second component ratio, and the value of the G signal of the ambient light image; and calculates a component due to near-infrared light included in the B signal of the ambient light image by multiplying the estimated reflectance, the third component ratio, and the value of the B signal of the ambient light image.

7. The image generation device of claim 6, wherein the visible light image generator obtains, as the reflectance, a value obtained by multiplying, by a predetermined coefficient, a ratio of the value of the signal of the pattern light image with respect to a product of the projection intensity and an inverse of a square of the distance to the object.

8. The image generation device of claim 7, wherein the distance information generator determines, from an arrangement of light spots in the pattern light image and a prestored relationship between a position of each light spot in a projection pattern due to the pattern light and a projection angle, a projection angle of each light spot in an imaged projection pattern, and obtains, on a basis of the determined projection angles, a distance to the object onto which the light spots are projected.

9. The image generation device of claim 8, further comprising an intensifying processor for adding, to a value of a signal of each pixel in the visible light image generated by the visible light image generator, values of signals of peripheral pixels after weighting the values, thereby intensifying the value of the signal of each pixel.

10. The image generation device of claim 7, further comprising an intensifying processor for adding, to a value of a signal of each pixel in the visible light image generated by the visible light image generator, values of signals of peripheral pixels after weighting the values, thereby intensifying the value of the signal of each pixel.

11. The image generation device of claim 6, wherein the distance information generator determines, from an arrangement of light spots in the pattern light image and a prestored relationship between a position of each light spot in a projection pattern due to the pattern light and a projection angle, a projection angle of each light spot in an imaged projection pattern, and obtains, on a basis of the determined projection angles, a distance to the object onto which the light spots are projected.

12. The image generation device of claim 11, further comprising an intensifying processor for adding, to a value of a signal of each pixel in the visible light image generated by the visible light image generator, values of signals of peripheral pixels after weighting the values, thereby intensifying the value of the signal of each pixel.

13. The image generation device of claim 6, further comprising an intensifying processor for adding, to a value of a signal of each pixel in the visible light image generated by the visible light image generator, values of signals of peripheral pixels after weighting the values, thereby intensifying the value of the signal of each pixel.

14. The image generation device of claim 1, further comprising an intensifying processor for adding, to a value of a signal of each pixel in the visible light image generated by the visible light image generator, values of signals of peripheral pixels after weighting the values, thereby intensifying the value of the signal of each pixel.

* * * * *